US008340357B2

(12) United States Patent
Iwasaki et al.

(10) Patent No.: US 8,340,357 B2
(45) Date of Patent: Dec. 25, 2012

(54) MOVING OBJECT DETECTION METHOD AND MOVING OBJECT DETECTION APPARATUS

(75) Inventors: Masahiro Iwasaki, Kyoto (JP); Kunio Nobori, Osaka (JP)

(73) Assignee: Panasonic Corporation, Osaka (JP)

( * ) Notice: Subject to any disclaimer, the term of this patent is extended or adjusted under 35 U.S.C. 154(b) by 452 days.

(21) Appl. No.: 12/671,793

(22) PCT Filed: Sep. 11, 2009

(86) PCT No.: PCT/JP2009/004523
§ 371 (c)(1),
(2), (4) Date: Feb. 2, 2010

(87) PCT Pub. No.: WO2010/050110
PCT Pub. Date: May 6, 2010

(65) Prior Publication Data
US 2011/0228987 A1 Sep. 22, 2011

(30) Foreign Application Priority Data
Oct. 27, 2008 (JP) ................................ 2008-276157

(51) Int. Cl.
*G06K 9/00* (2006.01)
(52) U.S. Cl. ........ 382/107; 382/103; 382/173; 382/190; 382/195; 382/225; 345/619; 48/138; 48/140
(58) Field of Classification Search .................. None
See application file for complete search history.

(56) References Cited

U.S. PATENT DOCUMENTS 7,003,156 B1 2/2006 Yamamoto et al.
7,630,562 B2 * 12/2009 Gong et al. .................. 382/219
8,009,897 B2 * 8/2011 Xu et al. ...................... 382/154
2006/0045349 A1 3/2006 Yamamoto et al.
2007/0127774 A1 * 6/2007 Zhang et al. ................. 382/103
2011/0255748 A1 * 10/2011 Komoto et al. .............. 382/103

FOREIGN PATENT DOCUMENTS
JP 8-214289 8/1996
(Continued)

OTHER PUBLICATIONS

Joshua Tenenbaum et al., "*A Global Geometric Framework for Nonlinear Dimensionality Reduction*", Science, vol. 290, Dec. 22, 2000, pp. 2319-2323.

(Continued)

*Primary Examiner* — John Lee
(74) *Attorney, Agent, or Firm* — Wenderoth, Lind & Ponack, L.L.P.

(57) ABSTRACT

A moving object detection method is provided which can accurately perform segmentation on an image including an object such as a person that moves changing shape. The method includes: accepting pictures included in the video (S101); calculating movement trajectories by detecting motions between two temporally adjoining pictures in units of blocks constituting each of the pictures and each including one or more pixels, and concatenating detected motions for all the pictures (S102 and S103); calculating distances each indicating similarity between the calculated movement trajectories (S104); and performing segmentation by performing geodetic distance transformation by combining distances smaller than a predetermined threshold from among the calculated distances, detecting a discontinuity point in a distribution of the calculated geodetic distances, and classifying, into one cluster, movement trajectories separate from each other at a geodetic distance smaller than a length indicating the detected discontinuity point (S105 and 106).

20 Claims, 21 Drawing Sheets

FOREIGN PATENT DOCUMENTS

| | | |
|---|---|---|
| JP | 11-66319 | 3/1999 |
| JP | 2000-222584 | 8/2000 |
| JP | 2005-332206 | 12/2005 |
| JP | 2007-87049 | 4/2007 |

OTHER PUBLICATIONS

P. Anandan, "*A Computational Framework and an Algorithm for Measurement of Visual Motion*", International Journal of Computer Vision, vol. 2, 1989, pp. 283-310, 1989.

Vladimir Kolmogorov et al., "*Computing Visual Correspondence with Occlusions via Graph Cuts*", International Conference on Computer Vision, 2001, pp. 1-37.

Thomas Pock et al., "*A Duality Based Algorithm for TV-L1-Optical-Flow Image Registration*", International Conference on Medical Image Computing and Computer Assisted Intervention, 2007.

Jianbo Shi et al. "*Good Features to Track*", IEEE Conference on Computer Vision and Pattern Recognition, Jun. 1994, pp. 593-600.

E.W. Dijkstra, "*A Note on Two Problems in Connexion with Graphs*", Numerische Mathematik, 1959, pp. 269-271.

\* cited by examiner

FIG. 7
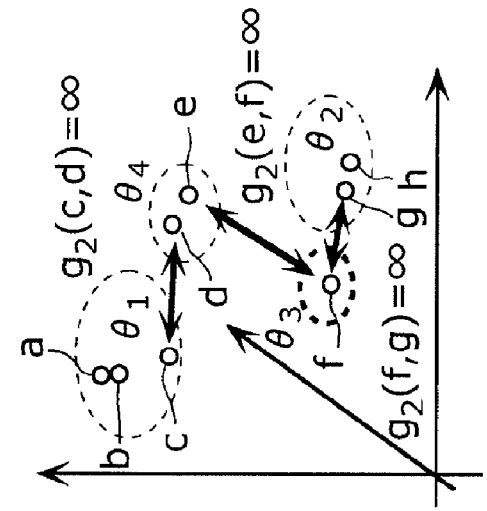
(c) Clustering result
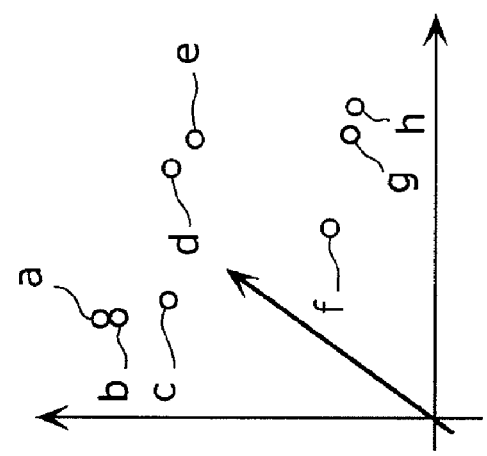
(b) Higher-dimensional space including movement trajectories
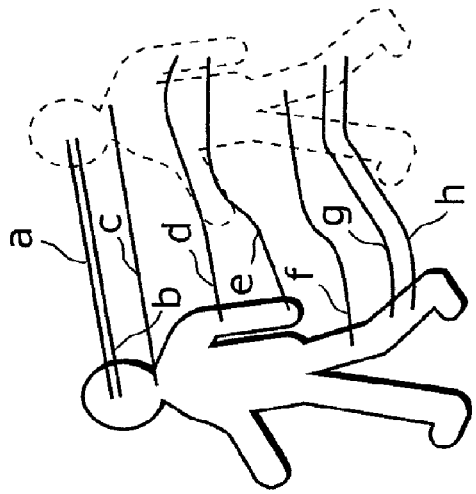
(a) Movement trajectories FIG. 12
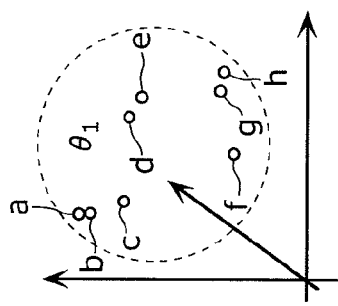
(a) Movement trajectories
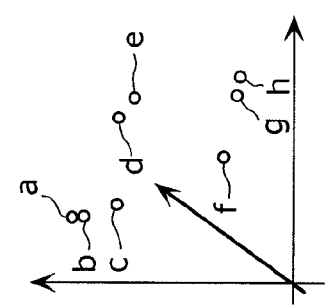
(b) Higher-dimensional space including movement trajectories
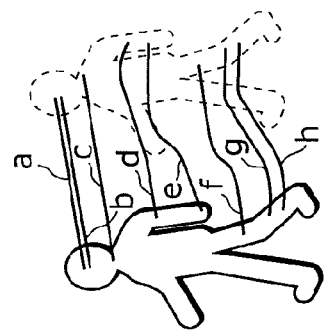
(c) Clustering where $R_k$ is sufficiently large
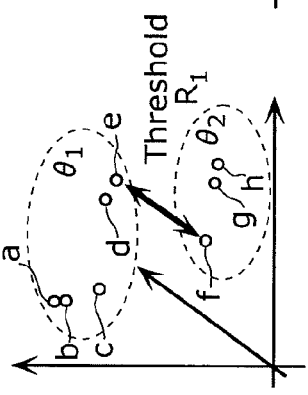
(d) Clustering in the case of $R_1$
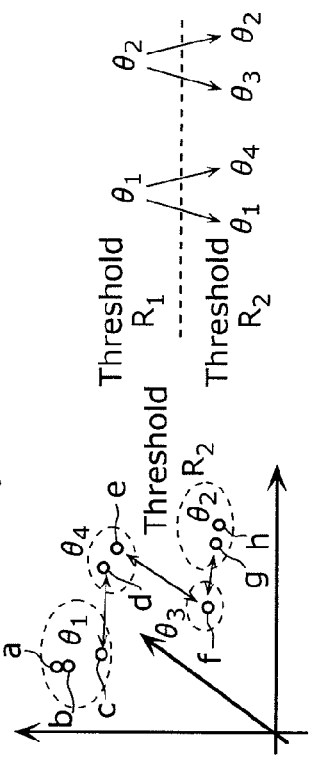
(e) Clustering in the case of $R_2$
(f) Obtain hierarchy FIG. 15
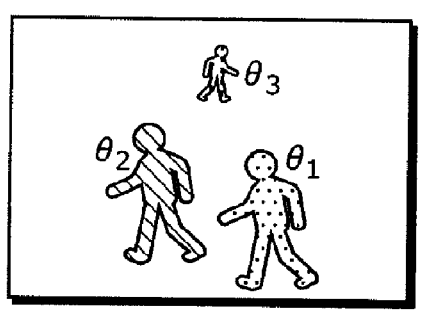
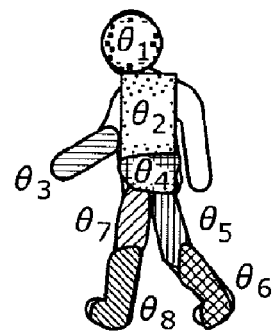
(a) (b)

FIG. 17

| Lavel | Pixel value and pixel position | Pixel movement trajectory information |
|---|---|---|
| $\theta_1$ | Pixel position and pixel value of a pixel belonging to $\theta_1$ in image at time T | $u^1_T, v^1_T, u^1_{T+1}, v^1_{T+1}, \cdots, u^1_{T+t}, v^1_{T+t}$ |
| $\theta_2$ | Pixel position and pixel value of a pixel belonging to $\theta_2$ in image at time T | $u^2_T, v^2_T, u^2_{T+1}, v^2_{T+1}, \cdots, u^2_{T+t}, v^2_{T+t}$ |
| $\theta_3$ | Pixel position and pixel value of a pixel belonging to $\theta_3$ in image at time T | $u^3_T, v^3_T, u^3_{T+1}, v^3_{T+1}, \cdots, u^3_{T+t}, v^3_{T+t}$ |

MOVING OBJECT DETECTION METHOD AND MOVING OBJECT DETECTION APPARATUS

TECHNICAL FIELD

The present invention relates to a method of detecting a moving object in an image, and relates particularly to a method of performing segmentation to specify all or part of regions of the moving object such as a person that moves changing shape, based on motion information on the image included in video composed of pictures.

BACKGROUND ART

As a method of detecting a moving object such as a person that moves changing shape or performing segmentation on an image including the moving object, there is a combination of techniques of extracting a candidate region of an object from the image and of applying a previously-prepared object model to the extracted candidate region of the object (for example, see Patent Literature 1 and Non Patent Literature 1). For example, Patent Literature 1 discloses a method of extracting a silhouette image of the object such as a person from pictures as an object candidate region and then applying, to the extracted silhouette, a model which is related to the object such as the person and in which regions of the object are previously parameterized based on knowledge related to the object. With this, it is possible to apply the parameterized model to the moving object such as a person that moves changing shape, thus allowing detection of the moving object and performance of segmentation.

In addition, Non Patent Literature 1 discloses a method of allowing images captured from similar viewpoints to be projected close-range on a two-dimensional space by: calculating a Euclidean distance between pixel value data in each image and pixel value data in the other images, using an input of images of a fixed moving object captured from plural viewpoints, and then performing geodetic distance transformation on the Euclidean distance, and then performing dimensional compression thereon. The literature shows that compared to a conventional linear dimensional compression method such as Principal Component Analysis (PCA), it is possible to perform lower-dimensional compression through geodetic distance transformation, and further to process the data that is non-linearly distributed.

CITATION LIST

Patent Literature

[PTL 1]
Japanese Unexamined Patent Application Publication No. 8-214289

Non Patent Literature

[NPL 1]
Joshua Tenenbaum, Vin de Silva, John Langford, "A Global Geometric Framework for Nonlinear Dimensionality Reduction", Science, Vol. 290, pp. 2319-2322, 22 Dec., 2000

SUMMARY OF INVENTION

Technical Problem

However, in Patent Literature 1 described above, there is a problem of being unable to accurately capture a moving object, particularly in a scene such as on the street where moving objects such as people are coming and going. In the moving object detection method represented by the above Patent Literature 1, it is necessary to extract an object candidate region from an image as described earlier. At this time, when the object candidate region is not accurately extracted, it is impossible to accurately apply a model in which the object is parameterized to the object candidate region. Particularly, in a crowded scene, it is difficult to accurately extract the object candidate region. For example, in the case where the image includes mixed moving objects that vary in size, there is a problem of accidentally extracting, as the object candidate region, plural moving objects as one moving object or accidentally extracting, as the object candidate region, a region in which no moving object to be extracted is present. In addition, in the case where a part of the moving object is occluded, there is also a problem of extracting plural moving objects as one object candidate region or being unable to extract the moving object as the object candidate region. Furthermore, even if the object candidate region is accurately extracted, there is another problem as follows. In the case of an articulated object such as a person, parameterizing the object model requires a vast amount of parameters due to significant variation in appearance that derives from various postures or sizes of the object. This induces misplacement of the model. Thus, there is a problem of being unable to accurately perform segmentation as a result of misplacing an object model corresponding to a posture that is different from a real posture.

On the other hand, according to the moving object detection method represented by Non Patent Literature 1, it is possible to project image data onto a low-dimensional space that is efficiently compressed, by nonlinearizing an input of a distance between images. Furthermore, it is possible to efficiently represent the data that is distributed continuously and non-linearly, through geodetic distance transformation and dimensional compression. However, since the primary object of Non Patent Literature 1 is to visualize similarity between images by projecting plural images onto a low-dimensional space, Non Patent Literature 1 fails to disclose a method of accurately detecting the moving object in response to the variation of postures of such an articulated object as a person that changes shape.

Thus, an object of the present invention is to provide a moving object detection method and a moving object detection apparatus which can accurately perform segmentation on an image including a moving object such as a person that moves changing shape, without being influenced by the posture and size of the moving object.

Solution to Problem

To solve this problem, the moving object detection method according to the present invention is a moving object detection method for detecting a moving object in video by dividing all or part of the moving object in the video into regions, and the moving object detection method includes: accepting pictures included in the video; calculating movement trajectories by detecting motions between two temporally adjoining pictures in units of blocks constituting each of the pictures and each including one or more pixels, and concatenating detected motions for all the pictures; calculating distances each indicating similarity between the movement trajectories, for the movement trajectories calculated in the calculating of movement trajectories; performing segmentation by: transforming the distances calculated in the calculating of distances into geodetic distances by combining distances smaller than a predetermined threshold from among the distances calculated in the calculating of distances; detecting a discontinuity point in a distribution of the obtained geodetic distances; and classifying, into one cluster, movement trajectories separate from each other at a geodetic distance smaller than a length indicating the detected discontinuity point; and outputting a result of the segmentation performed in the performing.

Note that the present invention can be realized not only as the moving object detection method described above but also as a program causing a computer to execute each of the above steps, and also as a computer readable recoding medium on which the program is stored, such as a CD-ROM.

Advantageous Effects of Invention

According to the method, the apparatus, and so on described above, it is possible to accurately detect a moving object such as a person that moves changing shape, and to accurately perform segmentation on the moving object. Furthermore, it is also possible to predict movement of the moving object, and so on, using a result of the detection and the segmentation.

BRIEF DESCRIPTION OF DRAWINGS

FIGS. 7(a) to (c) is a diagram showing an example of processing performed by the segmentation unit according to the first embodiment of the present invention.

FIGS. 12(a) to (f) is a diagram showing an example of processing performed by a segmentation unit according to the second embodiment of the present invention.

FIGS. 15(a) and (b) is a diagram showing an example of display performed by an image display unit in the first variation of the first and the second embodiments of the present invention.

FIG. 17 is a diagram showing an example of recording-transmission data according to the second variation of the first and the second embodiments of the present invention.

DESCRIPTION OF EMBODIMENTS

Figure 1:
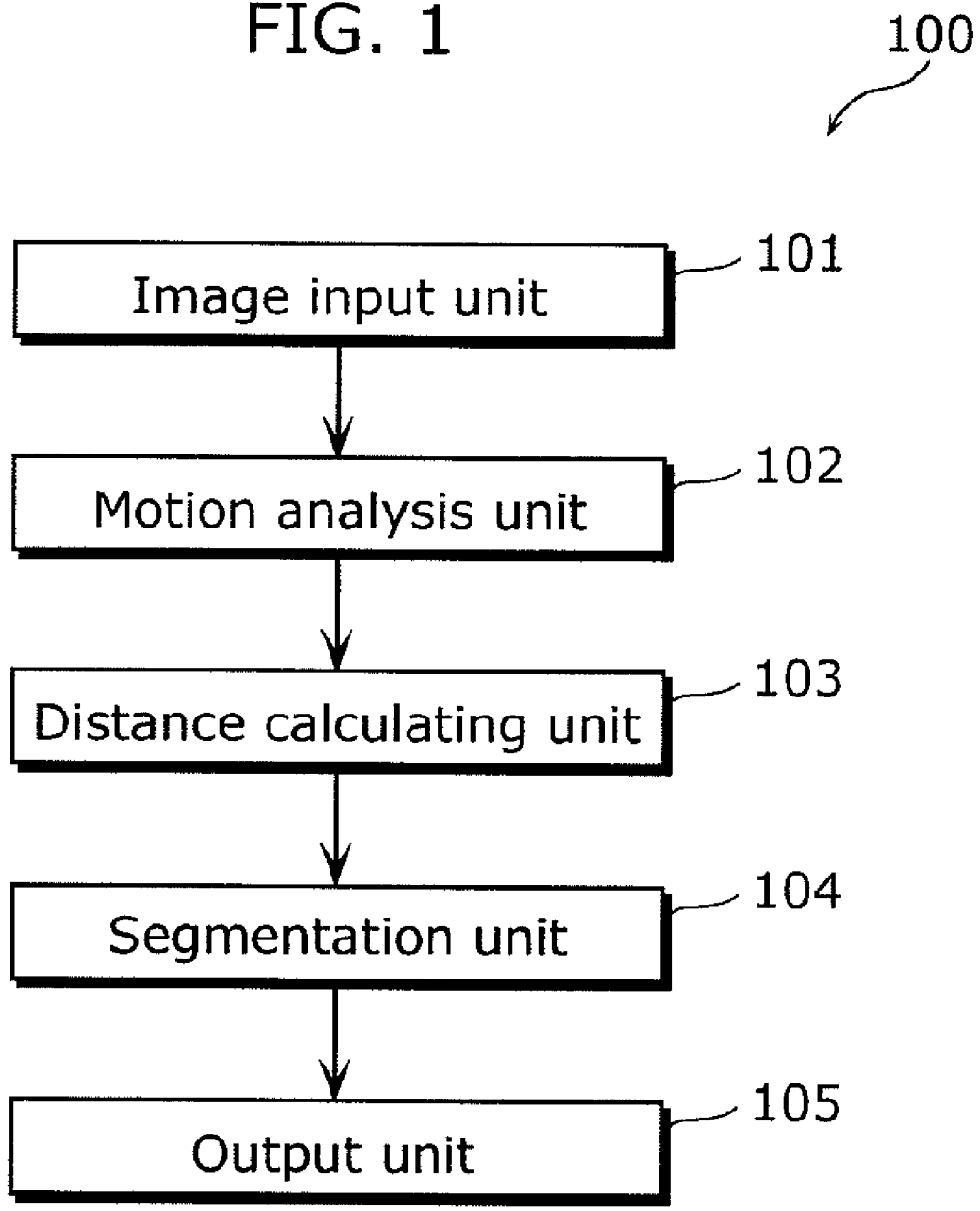
FIG. 1 is a functional block diagram showing a basic configuration of a moving object detection apparatus according to a first embodiment of the present invention.

According to an embodiment of the present invention, a moving object detection method is a method for detecting a moving object in video by dividing all or part of the moving object in the video into regions, and the moving object detection method includes: accepting pictures included in the video; calculating movement trajectories by detecting motions between two temporally adjoining pictures in units of blocks constituting each of the pictures and each including one or more pixels, and concatenating detected motions for all the pictures; calculating distances each indicating similarity between the movement trajectories, for the movement trajectories calculated in the calculating of movement trajectories; performing segmentation by: transforming the distances calculated in the calculating of distances into geodetic distances by combining distances smaller than a predetermined threshold from among the distances calculated in the calculating of distances; detecting a discontinuity point in a distribution of the obtained geodetic distances; and classifying, into one cluster, movement trajectories separate from each other at a geodetic distance smaller than a length indicating the detected discontinuity point; and outputting a result of the segmentation performed in the performing. With this, since movement trajectories separate at a distance smaller than the length of the discontinuity point are classified into one cluster, clustering is performed giving more consideration to spatiotemporal continuity regarding similarity between movement trajectories than in the case of clustering using a linear Euclidean distance. Thus, whether each block in the picture belongs to the same object (or the same region) or belongs to another object (or region) is reliably discriminated. As a result, even in the case of detecting an articulated object such as a person composed of regions having different motions, segmentation is accurately performed, and thus the moving object is reliably detected. In other words, it is possible to accurately perform segmentation on the moving object such as a person that moves changing shape, and to thereby detect the moving object in the image.

Note that, as a more detailed method for geodetic distance transformation, it is preferable that in the performing, when, in transforming the distances into the geodetic distances, a distance between a first movement trajectory and a second movement trajectory is transformed into a geodetic distance, a distance of a path leading from the first movement trajectory to the second movement trajectory be calculated as a geodetic distance by going through movement trajectories separate at a distance smaller than the predetermined threshold, the distance of the path being among the distances calculated in the calculating of distances.

In addition, in a more preferred embodiment according to the present invention, in the performing, the distances calculated in the calculating of distances are transformed into the geodetic distances after weighting is performed such that the geodetic distances become smaller for a higher density of the distribution of the movement trajectories, and by classifying the movement trajectories having high similarity into one cluster with higher accuracy through the distance transformation using the density of the distribution of movement trajectories, it is possible to reliably detect the moving object such as, in particular, a person that moves changing shape, and to accurately perform segmentation at the same time.

In addition, as one of specific methods for the performing, the performing may include: generating thresholds to be used for the segmentation and combining, for each of the generated thresholds, distances smaller than the each of the thresholds from among the distances calculated in the calculating of distances, to thereby transform the distances calculated in the calculating of distances into the geodetic distances, and detecting the discontinuity point in the distribution of the obtained geodetic distances and classifying, into one cluster, movement trajectories separate from each other at a geodetic distance smaller than the length indicating the detected discontinuity point to thereby perform the segmentation, so as to generate region candidates as a result of the segmentation; and obtaining an instruction regarding the number of classes and selecting, from among the region candidates generated in the generating, a region candidate which is divided into the number of regions that is equal to or closest to the obtained number of classes, so as to output the selected region candidate as a result of the segmentation. With this, since clusterings are performed with reference to respective determination criteria that are previously prepared, a desired number of clusters are generated from these clusterings.

In a more preferred embodiment according to the present invention, in the generating, values between a maximum value and a minimum value in the distances calculated in the calculating of distances are generated as the thresholds, and with this, by effectively setting the threshold, it is possible to detect, reliably and more quickly, the moving object such as, in particular, a person that moves changing shape, and to accurately perform segmentation at the same time.

In a more preferred embodiment according to the present invention, in the generating, an initial discontinuity point is detected for each of the distances calculated in the calculating of distances, when the thresholds are arranged in an order starting from a largest value to a smallest value, and values smaller than a length indicating the detected initial discontinuity point are generated as the thresholds, and with this, by effectively setting the threshold, it is possible to detect, reliably and more quickly, the moving object such as, in particular, a person that moves changing shape, and to accurately perform segmentation at the same time.

In a more preferred embodiment according to the present invention, in the generating, the discontinuity point is detected for each of the distances calculated in the calculating of distances, and that the segmentation is hierarchically performed according to threshold value, and with this, through hierarchical clustering, it is possible to perform extraction on the object such as, in particular, a person that moves changing shape, ranging from rough extraction of the moving object for identifying the position of the object in the image to precise extraction of the moving object based on detailed motions of the object.

In a more preferred embodiment according to the present invention, in the generating, the segmentation is hierarchically performed by detecting the discontinuity point for each of the distances calculated in the calculating of distances, in an order starting from a largest threshold, and detecting the discontinuity point using a smaller threshold in each of the clusters resulting from the segmentation, and with this, by performing hierarchical clustering of the thresholds in descending order, it is possible to perform extraction, with a smaller amount of calculation, on the object such as, in particular, a person that moves changing shape, ranging from rough extraction of the moving object for identifying the position of the object on the image to precise extraction of the moving object based on detailed motions of the object.

In a more preferred embodiment according to the present invention, in the generating, values are generated as the thresholds by increasing and decreasing the values of the distances calculated in the calculating of distances, centering on a mean value or a median, and with this, by effectively setting the threshold, it is possible to detect, reliably and more quickly, the moving object such as, in particular, a person that moves changing shape, and to accurately perform segmentation at the same time.

In a more preferred embodiment according to the present invention, in the generating, for each of the movement trajectories calculated in the calculating of movement trajectories, distances that are Nth smaller from the each of the movement trajectories are specified, and values selected for each of the specified distances in an order starting from a largest value are generated as the thresholds, and with this, by effectively setting the threshold, it is possible to detect, reliably and more quickly, the moving object such as, in particular, a person that moves changing shape, and to accurately perform segmentation at the same time.

In a more preferred embodiment according to the present invention, in the performing, a predetermined number of movement trajectories are selected for each of the distances calculated in the calculating of movement trajectories, in an order starting from a smallest distance, and the each of the distances is transformed into a geodetic distance after a distance from an unselected movement trajectory is nonlinearized into an infinite value, and with this, since the selected distances and the unselected distance are in a nonlinear relationship, the similarity or dissimilarity is more emphasized than in the linear distance, so that it is possible to accurately represent the motion of the object articulated with joints like a person.

In a more preferred embodiment according to the present invention, in the performing, from among the movement trajectories calculated in the calculating of movement trajectories, movement trajectories of which the distance is equal to or smaller than a predetermined threshold are selected, and each of distances is transformed into a geodetic distance after a distance from an unselected movement trajectory is nonlinearized into an infinite value, and with this, since the selected distances and the unselected distance are in a nonlinear relationship, the similarity or dissimilarity is more emphasized than in the linear distance, so that it is possible to accurately represent the motion of an object articulated with joints like a person.

In a more preferred embodiment according to the present invention, in the calculating of movement trajectories, one of a two-dimensional motion vector and an affine parameter which indicate the motion is calculated for the detection of the motion, and with this, it is possible to calculate the movement trajectories of blocks by analyzing motions of the blocks, using the motion vector or the affine parameter.

In a more preferred embodiment according to the present invention, in the calculating of distances, in addition to the similarity between the movement trajectories of the blocks, at least one of a distance between the blocks in the picture and an angle indicating a gradient of a line connecting the blocks is calculated, and with this, it is possible to efficiently capture the motion of the moving object such as a person that changes shape with rotational movements centering on joints.

According to an embodiment according to the present invention, the outputting includes displaying the result of the segmentation obtained in the performing, by superimposing the result on the pictures accepted in the accepting, and with this, it is possible to apply the method to form changes in sports, walking correction in rehabilitation, and so on by displaying, on the image, the regions resulting from the segmentation.

According to an embodiment according to the present invention, in the accepting, video including two or more moving objects is accepted, and in the performing, the two or more moving objects are detected by performing the segmentation on the two or more moving objects, and with this, it is possible to accurately detect moving objects from the image including moving objects that move changing shape.

According to an embodiment according to the present invention, the moving object detection method further includes predicting a motion of the moving object by calculating a movement trajectory representing a region specified in the performing, from movement trajectories of the blocks constituting the region, and predicting that the region is to move in accordance with the calculated movement trajectory representing the region, and with this, it is possible to perform motion prediction that is highly robust for noise by predicting the motion of the moving object, using the representative movement trajectory of the blocks.

According to an embodiment according to the present invention, the outputting includes specifying regions in the pictures accepted in the accepting, based on the result of the segmentation performed in the performing, so as to record or transmit, to a storage unit, the result of the segmentation corresponding to each of the specified regions, and with this, by storing respective detected images of the moving object based on the regions resulting from the segmentation, it is possible to efficiently store and output images as pictorial elements by selectively storing, and outputting to the outside, only an image of a necessary portion from each of the images of the moving object. Thus, this is effective in the case of storing and transmitting the data to a device having a limited processing capacity such as a cellular phone.

An embodiment according to the present invention includes: accepting pictures included in video; calculating movement trajectories by detecting motions between two temporally adjoining pictures in units of blocks each including one or more pixels and constituting each of the pictures, and concatenating detected motions for all the pictures; calculating distances each indicating similarity between movement trajectories, for the movement trajectories calculated in the calculating of movement trajectories; performing the segmentation based on a discontinuity point as a cluster boundary at which the movement trajectories are separate from each other at a distance equal to or larger than a predetermined value, by repeating processing for integrating, into a same cluster, the distances calculated in the calculating of distances in an order starting from a smallest distance; and outputting a result of the segmentation performed in the performing, and with this, by repeating the processing for integrating pairs of movement trajectories in ascending order of distance until the number of clusters reaches a predetermined number, it is possible to obtain the discontinuity point at which the movement trajectories are separate at a distance equal to or above a certain level. As a result, the clustering considering continuity related to similarity between movement trajectories is performed, so that the moving object can be detected.

Hereinafter, embodiments of the present invention are described with reference to the drawings.

[Embodiment 1]

FIG. 1 is a functional block diagram showing a basic configuration of a moving object detection apparatus 100 according to a first embodiment of the present invention. As FIG. 1 shows, the moving object detection apparatus 100 includes: an image input unit 101, a motion analysis unit 102, a distance calculating unit 103, a segmentation unit 104, and an output unit 105. In addition, the moving object detection apparatus 100 detects a moving object in video by performing segmentation to specify all or part of regions of the moving object in the video.

The image input unit 101 is a processing unit which accepts an input of temporally different images (pictures) included in the video, and is, for example, a video camera or a communications interface connected to the video camera, or the like.

The motion analysis unit 102 is a processing unit which calculates movement trajectories by detecting motions between two pictures temporally adjoining each other in units of blocks including one or more pixels and constituting the picture accepted by the image input unit 101, and concatenating the detected motions for pictures.

The distance calculating unit 103 is a processing unit which calculates a distance representing similarity between block motions, using the movement trajectory of a block i calculated by the motion analysis unit 102 and the movement trajectory of a block other than i, so as to capture shape variation of the moving object. For example, in the case of using movement trajectories of N blocks, the distance is calculated to be an N×N distance matrix. Here, by calculating the distance for evaluating the motion similarity between blocks, it is possible to represent, as a distance matrix, motions of a moving object having an inter-block distance changing by motion, especially motions of an object such as a person that moves changing shape like an articulated object. Note that in the description hereafter, the movement trajectory of the block i is referred to as a movement trajectory i. Thus, the "distance" as described in the present specification includes not only a distance between two points in a two-dimensional space but also an arithmetic distance between multi-dimensional data, and is equivalent to a value or a set of values (distance matrix).

The segmentation unit 104 is a processing unit which performs segmentation by clustering, using a threshold used for the segmentation, the movement trajectories calculated by the motion analysis unit 102. Specifically, the segmentation unit 104 performs segmentation on the threshold by: applying geodetic distance transformation to the distance matrix calculated by the distance calculating unit 103, using a threshold related to data continuity, which is, in other words, transforming the respective distances calculated by the distance calculating unit 103 into geodetic distances by combining distances smaller than the threshold from among the distances calculated by the distance calculating unit 103; detecting a discontinuity point, for each threshold, in the distribution of the distance between movement trajectories after the transformation into the geodetic distances; and performing clustering on movement trajectories that are continuously distributed so as to classify, into one cluster, movement trajectories separate from each other at a geodetic distance shorter than a length indicating the detected discontinuity point.

Note that in the case of transforming the distances (distance matrix) calculated by the distance calculating unit 103 into geodetic distances (geodetic distance transformation), when transforming a distance between a first movement trajectory and a second movement trajectory into the geodetic distance, the segmentation unit 104 calculates, as the geodetic distance, a distance of a path leading from the first movement trajectory to the second movement trajectory by going through movement trajectories separate from each other at a distance smaller than a predetermined threshold, among the distances calculated by the distance calculating unit 103.

The output unit 105 is a writing unit which outputs a result of the detection of the moving object in the video or the result of the segmentation of the image that has been performed by the segmentation unit 104, to a memory or a recording medium, or an output interface or the like which outputs the results to the display apparatus.

In the present specification, since each of the regions resulting from the segmentation corresponds to each of the moving objects, the detection of each moving object is not particularly distinguished from the segmentation for dividing plural moving objects in the image into separate regions. That is, the "moving object detection" processing is equivalent to the "segmentation" processing.

Figure 2:
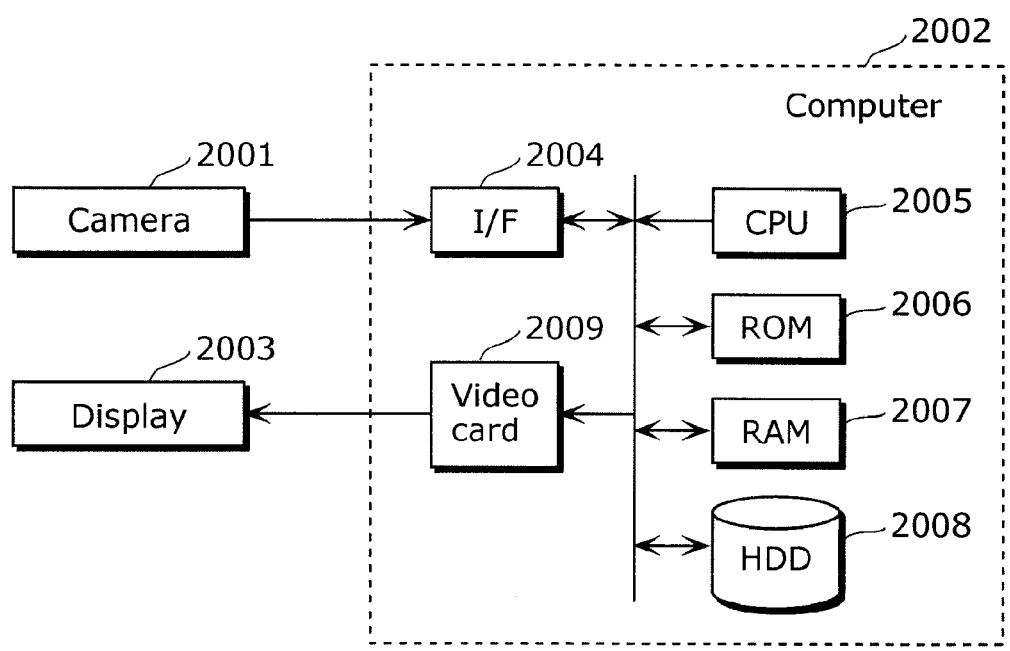
FIG. 2 is a block diagram showing a hardware configuration of the moving object detection apparatus according to the present invention.

Note that each of the constituent elements (the image input unit 101, the motion analysis unit 102, the distance calculating unit 103, the segmentation unit 104, and the output unit 105) that are included in the moving object detection apparatus 100 may be realized by, as shown in FIG. 2, software such as a program executed on a computer 2002 including a video card 2009 or the like which outputs a video signal to an interface (I/F) 2004, a CPU 2005, a RAM 2007, a ROM 2006, a hard disk 2008, and a display 2003 that receive an image transmitted from a camera 2001, and may also be realized by a hardware such as an electronic circuit. In other words, of constituent elements according to the present embodiment, the constituent elements except the input unit and the output unit such as lo the display device or the like may be realized as a program or data (that is, software) executed by the computer, or as a hardware such as an electronic circuit, memory, or a recording medium, or as a mixture thereof. Hereinafter, the moving object detection apparatus according to another embodiment is the same as above.

Hereinafter, the moving object detection method according to the present invention, that is, an operation of the moving object detection apparatus 100 will be described in detail with reference to a flowchart in FIG. 3, using an example of detecting (that is, performing segmentation on) a moving object that moves.

First, in Step S101, the image input unit 101 accepts an input of pictures.

Next, in Step S102, the motion analysis unit 102 calculates block motion from at least two pictures. Note that pixel motion is calculated here as an example of calculating the block motion. Hereinafter, in the present embodiment, per-pixel processing will be described as an example of per-block processing. Note that in the case of processing on the basis of a block including pixels, data (representative value) corresponding to the block may be calculated by (i) summing the data corresponding to the pixels by an amount equivalent to the block, (ii) calculating a mean value for the block, and (iii) calculating a median for the block, so as to perform the processing using a representative value as in the per-pixel processing. Note that in the present specification, the "block motion" and the "pixel motion" refer to the "per-block motion" and the "per-pixel motion", respectively.

First, an example of calculating the pixel motion by optical flow calculation will be described. A technique disclosed by Non Patent literature 2 or a technique disclosed by Non Patent literatures 3 and 4 can be used for calculating a motion vector by the optical flow calculation.

[Non Patent Literature 2] P. Anandan, "A computational Framework and an Algorithm for the Measurement of Visual Motion", International Journal of Computer Vision, Vol. 2, pp. 283-310, 1989

[Non Patent Literature 3] Vladimir Kolmogorov and Ramin Zabih, "Computing Visual Correspondence with Occlusions via Graph Cuts", International Conference on Computer Vision, 2001

[Non Patent Literature 4] Thomas Pock, Martin Urschler, Christopher Zach, Reinhard Beichel and Horst Bischof, "A Duality Based Algorithm for TV-L1-Optical-Flow Image Registration", International Conference on Medical Image Computing and Computer Assisted Intervention, 2007

For example, assuming that T pictures are inputted in Step S101, the motion analysis unit 102 estimates a motion vector of a pixel i ($u^i_t$, $v^i_t$), using the pictures inputted at time t and time t+1. Here, frames need not be continuous, and the pixel motion may also be calculated using pictures inputted, for example, at time t and time t+n. However, n is an integer equal to 1 or larger. Furthermore, as the pixel motion, an affine parameter may be estimated instead of a two-dimensional motion vector. At this time, motion information may be obtained for every pixel. In addition, when high-speed processing is intended, the image may be sectioned into grids so as to obtain motion information on pixels on the grids at predetermined intervals, or the image may be sectioned into blocks, as described earlier, so as to obtain motion information on a per-block basis. Furthermore, when calculating a motion vector using Non Patent Literature 2, it is possible to calculate reliability of the motion vector, and thus only the pixels having highly reliable motion information may be used. In addition, when calculating the motion vector using Non Patent Literature 3, it is possible to estimate occlusion. Thus, only information on pixels that are not occluded may be used. In addition, Non Patent Literature 4 is known for high-speed processing and thus may be used when high-speed processing is required.

Furthermore, as a method of calculating the pixel motion, a method of calculating a motion vector by assuming affine transformation of the block may be used, instead of using the method of calculating the motion vector by assuming parallel movement of the block as described earlier. As the method of calculating the motion vector by assuming affine transformation, a technique disclosed by Non Patent Literature 5 may be used.

[Non Patent Literature 5] Jianbo Shi and Carlo Tomasi "Good Features to Track", IEEE Conference on Computer Vision and Pattern Recognition, pp. 593-600, 1994

The method described above assumes an affine parameter $A^i_t$ corresponding to a motion in the neighborhood of the pixel i of the pictures inputted at time t and time t+1. With respect to the pixel i, pixel positions $x^i_t$ and $x^i_{t+1}$ on the picture at time t and time t+1 are in the following relationship.

[Math. 1]

$$x_{t+1}^i = A_t^i x_t^i \quad \text{(Expression 1)}$$

The above method can estimate, particularly for a moving object that is rotationally moving, the motion of the pixel i more accurately than in the case of using the technique of calculating the vector by assuming parallel movement.

Figure 4:
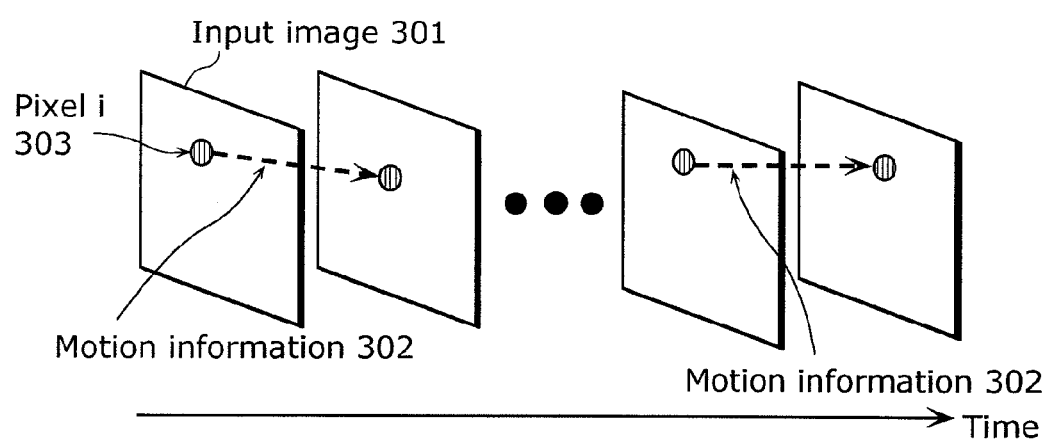
FIG. 4 is a flowchart showing an example of processing performed by a motion analysis unit according to the first embodiment of the present invention.

Next, in Step S103, the motion analysis unit 102 calculates, for temporally different pictures, a movement trajectory i from the pixel motion, using the motion information calculated in Step S102. Hereinafter, the movement trajectory of the pixel i is referred to as the movement trajectory i. As FIG. 4 shows, the motion of the pixel i is followed, starting from a pixel i303 of an input image 301 inputted at time t, using motion information 302 that is calculated in Step S102. At this time, by using the pixel position $(x_t^i, y_t^i)$ on the picture at time t at which the pixel i passed, the movement trajectory i is calculated as follows.

[Math. 2]

$$x^i = (x_1^i, y_1^i, \ldots, x_t^i, y_t^i, \ldots, x_T^i, y_T^i) \quad \text{(Expression 2)}$$

Here, T is the number of pictures used for the calculation of the movement trajectory.

Next, in Step S104, the distance calculating unit 103 calculates the distance matrix including similarity in pixel motion, using the movement trajectory i calculated by Expression 2 above. A linear distance $f(i, j)$ between the movement trajectory i and the movement trajectory j can be calculated as Expression 3 below.

[Math. 3]

$$f(i, j) = ptn_{ij} + w \cdot mtn_{ij} \quad \text{(Expression 3)}$$

Here, w is a weighting factor, and is parameter to be set by a designer. Furthermore, Expression 3 above may be modified as Expression 4 below.

(Expression 4)

$$f(i, j) = 1.0 - \exp\left(-\frac{w \cdot mtn_{ij}}{ptn_{ij}}\right) \quad \text{[Math. 4]}$$

In addition, $ptn_{ij}$ and $mtn_{ij}$ are expressed in Expressions 5 and 6 below, respectively.

(Expression 5)

$$ptn_{ij} = \frac{1}{T} \sum_{t=1}^{T} d_{ij}^t \quad \text{[Math. 5]}$$

(Expression 6)

$$mtn_{ij} = \sqrt{\frac{1}{T} \sum_{t=1}^{T} (d_{ij}^t - ptn_{ij})^2} \quad \text{[Math. 6]}$$

Here,
[Math. 7]

$$d_{ij}^t = \sqrt{(x_t^i - x_t^j)^2 + (y_t^i - y_t^j)^2} \quad \text{(Expression 7)}$$

As above, as shown in Expression 3 above, in addition to a temporal mean value of the distance between movement trajectories that is expressed by Expression 5 above, temporal variation between movement trajectories that is expressed in Expression 6 above is an element of the linear distance $f(i, j)$. The temporal variation between movement trajectories expressed by Expression 6 above particularly shows similarity in pixel motion, and thus allows capturing of not only a rigid body of which the distance relationship between pixels does not temporally change but also shape variation of an articulated object or the like. Note that the same advantageous effect can be expected when a temporal fluctuation component as shown in Expressions 8 to 13 below is used instead of Expression 6 above.

(Expression 8)

$$mtn_{ij} = \frac{1}{(T-1)} \sum_{t=1}^{T-1} (1 - \cos\theta_{ij}^t) \quad \text{[Math. 8]}$$

Here, (Expression 9)

$$\cos\theta_{ij}^t = \frac{\langle u_i^t \cdot u_j^t \rangle}{|u_i^t||u_j^t|} \quad \text{[Math. 9]}$$

where $u_i^t$ is a motion vector $(u_t^i, v_t^i)$ from time t to t+1, and $\langle u_i^t \cdot u_j^t \rangle$ is an inner product.

In addition, the following calculation may be used.

(Expression 10)

$$mtn_{ij} = \text{mtn\_max} - \frac{1}{(T-1)} \sum_{t=1}^{T-1} \langle u_i^t \cdot u_j^t \rangle \quad \text{[Math. 10]}$$

Here, (Expression 11)

$$\text{mtn\_max} = \max_i \left( \frac{1}{(T-1)} \sum_{t=1}^{T-1} \langle u_i^t \cdot u_j^t \rangle \right) \quad \text{[Math. 11]}$$

(Expression 12)

$$mtn_{ij} = \frac{1}{(T-1)} \sum_{t=1}^{T-1} \sqrt{(u_i^t - u_j^t)^2 + (v_i^t - v_j^t)^2} \quad \text{[Math. 12]}$$

Here,
[Math. 13]

$$u_i^t = (u_i^t, u_j^t) \quad \text{(Expression 13)}$$

Next, the segmentation unit 104 performs Step S105 (geodetic distance transformation) and S106 (segmentation). Specifically, in S105, as shown in Expression 14 below, the segmentation unit 104 calculates $f'(i, j)$ by nonlinearizing, using a threshold R, the linear distance $f(i, j)$ calculated by Expression 3 or 4 above, with respect to the threshold R.

(Expression 14)

$$f'(i, j) = \begin{cases} f(i, j) & \text{if } i \text{ is } R-NearestNeighbor \\ \infty & \text{otherwise} \end{cases} \quad \text{[Math. 14]}$$

In other words, when the movement trajectory i is a current movement trajectory, the segmentation unit 104 selects R movement trajectories j in ascending order of the linear distance from the current movement trajectory i, and does not change the distance from the selected movement trajectories j, and infinitely changes the distance from an unselected movement trajectory j. Note that here movement trajectories are selected in ascending order of the linear distance f(i, j), but the threshold R may be set as the following expression.

(Expression 15)

$$f'(i, j) = \begin{cases} f(i, j) & \text{if } f(i, j) < R \\ \infty & \text{otherwise} \end{cases}$$ [Math. 15]

In other words, as shown in Expression 14 above, the segmentation unit 104 may select, for each of the movement trajectories calculated by the motion analysis unit 102, a predetermined number of movement trajectories in ascending order of the distance, and transform respective distances into geodetic distances after performing nonlinearization to transform a distance from the unselected movement trajectory into an infinite value; alternatively, as shown in Expression 15 above, the segmentation unit 104 may select, for each of the movement trajectories j calculated by the motion analysis unit 102, a movement trajectory j located at a distance equal to or less than a predetermined threshold and transform the respective distances into geodetic distances after performing nonlinearization to transform, into an infinite value, the distance from the movement trajectory that is not selected.

Note that a technique for nonlinearizing the distance is not limited to the functions described above, but any technique may be used as long as nonlinear transformation is performed on the distance related to the movement trajectories i and j.

Furthermore, processing according to Expressions 14 or 15 may be performed, after weighting the linear distance f(i, j) by multiplying the weight calculated using Expressions 16 and 17 as below.

(Expression 16)

$$wf_{ij} = 1.0 - \exp\left(-z\left(\frac{1}{N_g}\sum_{a \in NN} f(a, j) + \frac{1}{N_b}\sum_{b \in NN} f(i, b)\right)\right)$$ [Math. 16]

Here, NN represents processing to be performed on a neighborhood point of the movement trajectory; that is, NN represents calculation, for each of the movement trajectories a and b, using a movement trajectory within a predetermined range of distance from each of the movement trajectories i and j or using N movement trajectories in ascending order of the distance. That is, $N_a$ and $N_b$ are the number of movement trajectories within a predetermined range of distance or the N described above. Note that z is to be set by the designer.

In addition, variance may be used as in the following Expression 17 instead of Expression 16 above.

(Expression 17)

$$wf_{ij} = 1.0 - \exp\left(-z\left(\frac{1}{N_a}\sum_{a \in NN}(f(a, j) - \overline{f(a, j)})^2 + \frac{1}{N_b}\sum_{b \in NN}(f(i, b) - \overline{f(i, b)})^2\right)\right)$$ [Math. 17]

Here, (Expression 18)

$$\overline{f(a, j)} = \frac{1}{N_a}\sum_{a \in NN} f(a, j)$$ [Math. 18]

(Expression 19)

$$\overline{f(i, b)} = \frac{1}{N_b}\sum_{b \in NN} f(i, b)$$ [Math. 19]

and the neighborhood point is the same as in Expression 16 above.

By transforming f(i, j) using the weight in Expressions 16 and 17 above, f(i, j) is relatively small when the movement trajectories similar to the movement trajectories i and j are spatially concentrated (when the distance between movement trajectories is small), and f(i, j) is relatively large when the movement trajectories similar to the movement trajectories i and j are spatially dispersed (when the distance between the movement trajectories is large). That is, when transforming each of the distances calculated by the distance calculating unit 103, the segmentation unit 104 transforms each of the distances into a geodetic distance by performing weighting such that the geodetic distance becomes smaller for a higher distribution density of the movement trajectories calculated by the motion analysis unit 102. With this, it is possible to perform distance transformation considering the distribution density of the movement trajectories of pixels.

Next, the segmentation unit 104 calculates the geodetic distance as in the following expression, using the nonlinearized distance f'(i, j).

[Math. 20]

$$g(i, j) = \min(f'(i, j), f'(i, s) + f'(s, j))$$ (Expression 20)

Note that min(x, y) is a function which returns a smaller one of the value x and the value y. In addition, s is a movement trajectory s, and is a relay point to go through in order to reach the movement trajectory j from the movement trajectory i. Here, the relay point s in f'(i, s)+f'(s, j) is not limited to one point. This method is a shortest path search method known as Dijkstra method and described in the following Non Patent Literature 6.

[Non Patent Literature 6] E. W. Dijkstra, "A note on two problems in connexion with graphs", Numerische Mathematik, pp. 269-271, 1959

Here, the nonlinearization expressed in Expressions 14 and 15 above will be described with reference to the conceptual diagram in FIGS. 5(a) to (c). Here, the nonlinearization expressed in Expression 15 above will be described, but the same advantageous effect can be expected with other nonlinearization processing.

First, FIG. 5(a) shows two-dimensional data distribution. Here, each data point corresponds to the movement trajectory i shown in Expression 3 or 4 above. When nonlinearization is not performed according to Expressions 14 to 17 above, as shown in FIG. 5(b), a distance between a data point i and a data point j is smaller than a distance between the data point i and a data point k. However, as shown in FIG. 5(c), for example, by performing the processing in Expression 15 or the processing in Expression 17 above, the distance between the data point i and the data point j is not calculated in the Euclidean distance but a distance referred to as the geodetic distance which passes through the data points as indicated by an arrow. As a result, unlike the case of using the Euclidean distance, the distance between the data point i and the data point j becomes larger than the distance between the data point i and the data point k.

Figure 6:
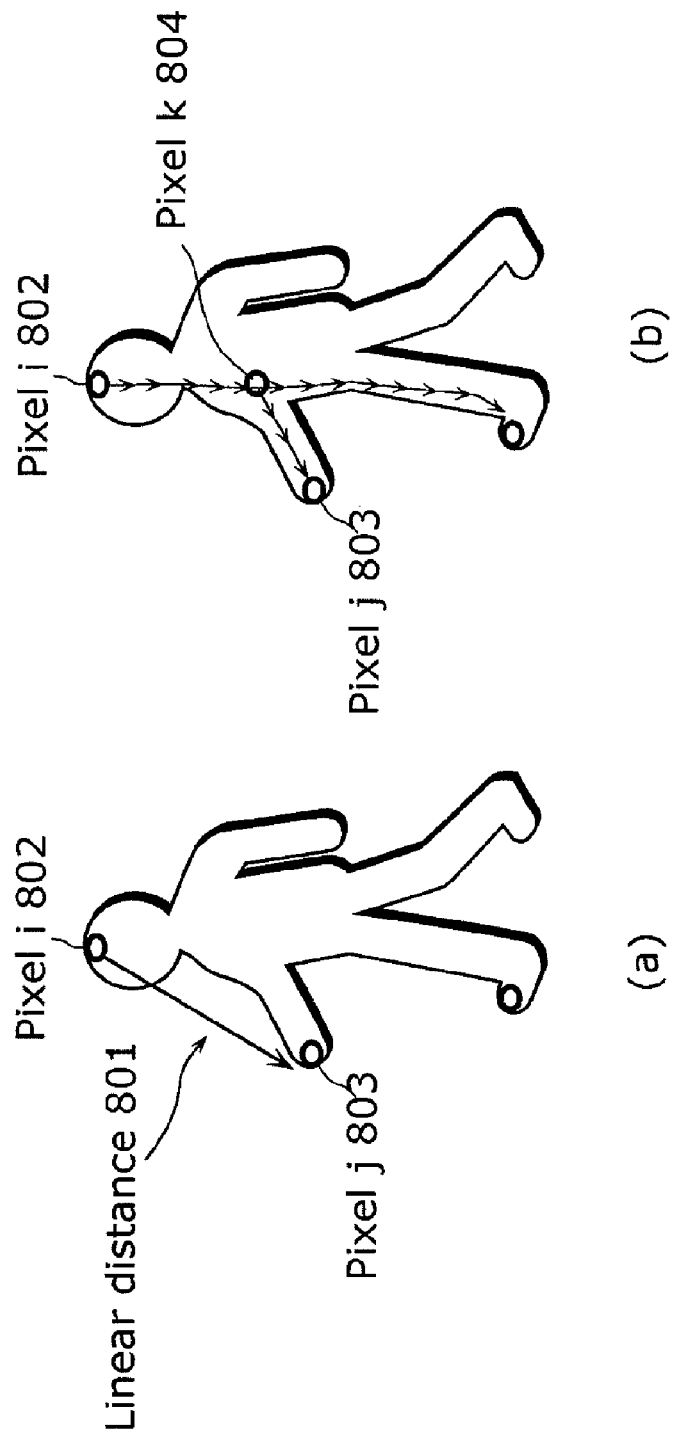
FIGS. 6(a) and (b) is a diagram showing an example of an advantageous effect produced by the segmentation unit using the geodetic distance according to the first embodiment of the present invention.

Here, the characteristics of the geodetic distance transformation expressed in Expressions 14 to 17 above are described with reference to the conceptual diagram in FIGS. 6(a) and (b). Here, in order to clearly describe the difference between the linear distance f(i, j) and the geodetic distance g(i, j), the distance between movement trajectories at time t, as shown in Expression 5, is given as an example. In practice, it is possible to capture not only the shape but also the shape variation of an articulated object or the like by using, as expressed in Expression 3, a fluctuation component of the distance between the movement trajectories is used as similarity in pixel motion, in addition to the distance between movement trajectories. FIG. 6(a) is an example of the case where the processing in Expressions 14 to 17 above is not performed. For example, a distance between a head-region pixel 1802 and a finger-region pixel j803 becomes a distance indicated by a linear distance 801. On the other hand, when the threshold R is properly set, the distance between the head-region pixel j802 and the finger-region pixel j803 becomes a distance that is a linear summation indicated by an arrow going through a pixel k804 to the pixel j, as shown in FIG. 6(b), by the nonlinearization as expressed in Expressions 14 to 17 above. Thus, whereas the linear distance 801 cannot continuously represent, as the data, the shape of an object articulated with joints like a person, the geodetic distance can express, as distance, continuity of such a shape articulated with joints. Note that the method of calculating the geodetic distance is not limited to Expression 17 above.

Next, in Step S106, the segmentation unit 104 performs clustering by detecting the discontinuity point, using g(i, j) obtained by the geodetic distance transformation with respect to the threshold R in Step S105. Here, the discontinuity point is where g(i, j) becomes infinite between the movement trajectory i and the movement trajectory j. An example of a result of the geodetic distance transformation obtained with respect to the threshold R will be described with reference to FIGS. 7(a) to (c). Here, FIG. 7(a) is a diagram showing movement trajectories from a to h, and FIG. 7(b) is a conceptual diagram of a higher-dimensional space, which shows the movement trajectories from a to h shown in FIG. 7(a). Note that FIG. 7(a) shows eight movement trajectories from a to h, but in practice, a movement trajectory corresponding to each pixel may also be used, or a movement trajectory calculated on a per-block basis may also be used. Here, a point indicating one of the movement trajectories from a to h in the higher-dimensional space corresponds to a movement trajectory expressed in Expression 2 above. That is, the points in the higher-dimensional space are a result of going through not only a region on a single picture but also pixels for temporally different pictures. Furthermore, on the higher-dimensional space, a point-to-point distance does not correspond to the Euclidean distance between vectors but corresponds to the geodetic distance as expressed in Expression 20.

FIG. 7(c) is a diagram showing a result of the clustering. Here, in FIG. 7(c), f(e, f)>f(c, d)>f(f, g)>f(b, c) where f(a, b) is the distance between the movement trajectories a and b which is expressed in Expression 3 or 4. In addition, when R is set as the threshold, the distance f(f, g) has a larger value than R. In this case, even when the geodetic distance is obtained by Expression 17 above, each of g(e, f), g(c, d), and g(f, g) becomes infinite. Thus, the segmentation unit 104 determines that discontinuity points are present between: the movement trajectories c and d, the movement trajectories e and f, and the movement trajectories f and g. As a result, the movement trajectories a, b, and c do not have infinite values because each of them can be traced without going through a corresponding one of the discontinuity points; in contrast, for example, from the movement trajectories a, b, and c to the other movement trajectories, they have infinite values because they pass through the discontinuity point g(c, d). Thus, a pair of movement trajectories i and j is grouped into the same cluster when they do not have an infinite geodetic distance, and is grouped into another cluster when they have an infinite geodetic distance. Then, the movement trajectories can be separated into a total of four clusters $\theta_1$, $\theta_2$, $\theta_3$, and $\theta_4$ by clustering pairs having infinite geodetic distances and pairs not having infinite geodetic distances.

Here, the property of the threshold R will be described. When the threshold R is smaller, there is a trade-off that a smaller moving object can be detected on the image while false detection (false positive) increases on the other hand. Thus, for example, when, for monitoring purpose and so on, it is previously known what range is intended for the detection of the moving object, the threshold R may be set according to a smallest size of the moving object intended for the detection and the motions thereof on the image. In addition, it is also possible to calculate a detection rate and a false detection rate while changing the threshold R at the same time, so as to select a threshold R at which the detection rate is equal to the false detection rate, that is, to select the threshold R that becomes an Equal Error Rate (EER), or it is also possible to select the threshold R by giving priority to the detection rate or preferentially reducing the false detection rate.

With the processing described above, the segmentation unit 104 can determine that the pairs of movement trajectories not having infinite geodetic distances are continuous and thus belong to the same cluster, and can separate clusters based on the discontinuity points by determining that the pairs of movement trajectories having infinite distances are discontinuous.

The output unit 105 outputs, as a result of the segmentation, the movement trajectories separated into clusters in S106 to inside of the apparatus (such as memory) or outside (a recording medium, a display device, and so on). With this, the moving object can be detected.

Note that according to the present embodiment, it is possible to perform segmentation considering the pixel position and motion similarity by calculating the distance as expressed in Expression 3 or 4 above. Accordingly, in the example shown in FIGS. 7(a) to (c), a difference between motions of a head region and arms, and a difference between upper and lower thighs are reflected, so that the head region, the arms, the upper thighs, and the lower thighs can be divided into regions as separate clusters. Furthermore, the present method allows, in the same manner, not only detecting body parts of the moving object and performing segmentation but also detecting each moving object and performing segmentation in a scene where more than one person is present.

Thus, by performing the clustering based on the discontinuity point calculated using the geodetic distance, it is possible, as a result, to detect the moving object and perform segmentation.

As described above, since the segmentation is performed on similar movement trajectories classified by the clustering based on the inter-pixel distance or the similarity between the movement trajectories, regions having smaller distances and similar motions are recognized as one region, and, as a result of temporally going through the region of the object moving in the video, it is possible to detect the moving object in the video or the regions of the moving object and to perform segmentation on the image including the moving object, irrespective of postures of the articulated object. In addition, since the clustering is performed based on the similarity between movement trajectories and using plural thresholds without requiring setting of a human candidate region as preprocessing, no failure occurs in detecting the human candidate region, which becomes a problem particularly where moving objects having various sizes are present in the image or when a part of the moving object is occluded, nor does such false detection cause a failure in the segmentation. Furthermore, since the clustering based on the discontinuity point allows clustering that is not influenced by the cluster size, it is possible to reliably extract the clusters in the case where a large object and a small object are mixed together or where an object having a large motion and an object having a small motion are mixed together.

As above, by performing clustering in a nonlinear space without requiring fitting of a vast quantity of parameters, it is possible to accurately perform segmentation on video including a human object that moves changing shape, to thereby detect the moving object in the video.

Note that the moving object detection apparatus according to an embodiment of the present invention may perform segmentation using a method different from the segmentation method according to the present embodiment, which is based on the discontinuity point in geodetic distances. Hereinafter, the method different from the segmentation according to the first embodiment, that is, a method of performing segmentation without transformation into geodetic distances will be described as a variation of the first embodiment.

As FIG. 1 shows, a moving object detection apparatus according to the present variation basically includes: the image input unit 101, the motion analysis unit 102, the distance calculating unit 103, the segmentation unit 104, and the output unit 105. In addition, the moving object detection apparatus 100 detects a moving object in video by performing segmentation to specify all or part of the regions of the moving object in the video. Since the image input unit 101, the motion analysis unit 102, and the distance calculating unit 103 are the same as in the first embodiment, the description thereof will be omitted. The segmentation unit 104 according to the present variation performs segmentation by a method different from the method according to the first embodiment. Hereinafter, the description will focus on the segmentation unit 104 according to the present variation.

Figure 8:
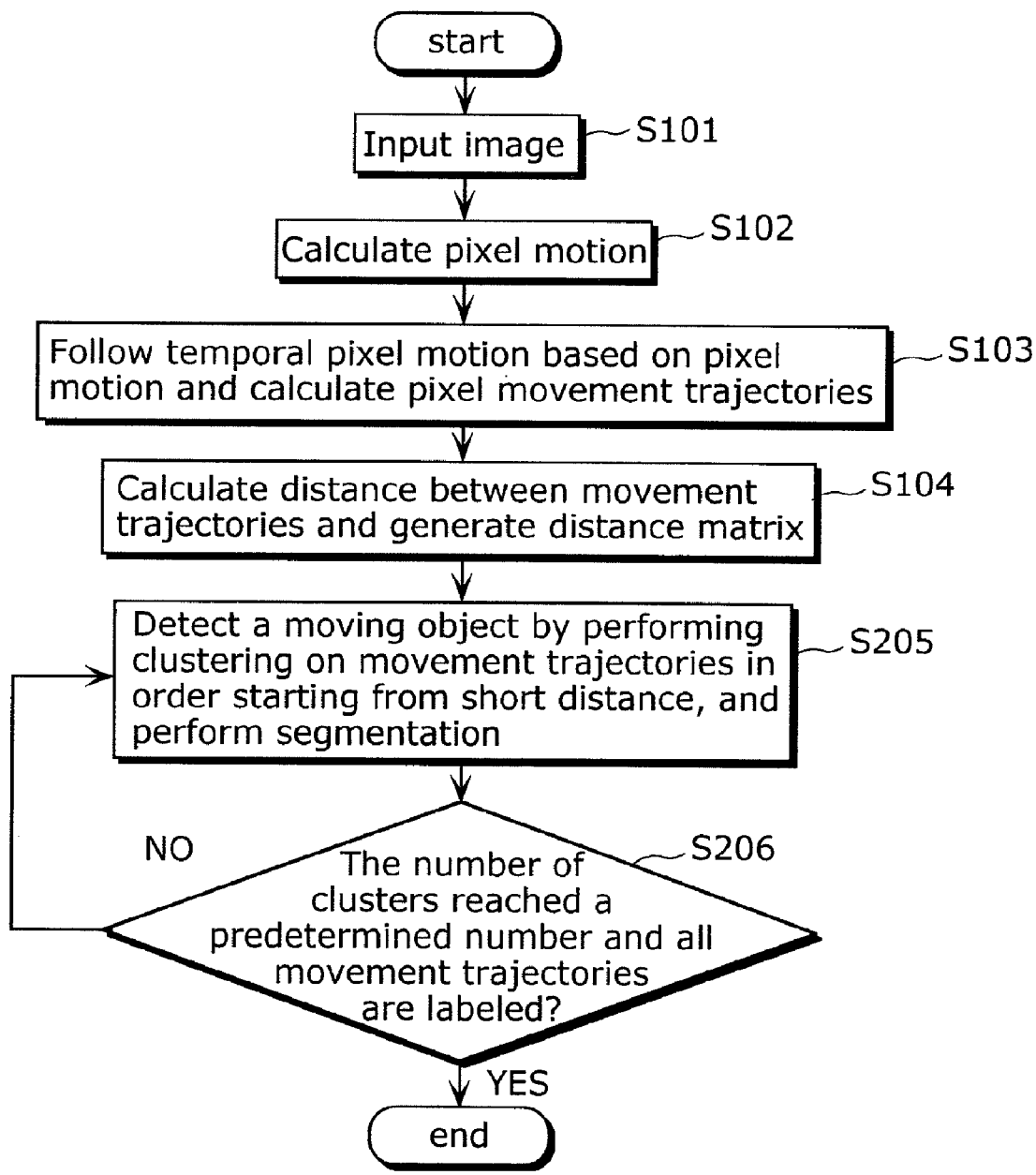
FIG. 8 is a flowchart showing a basic operation of the moving object detection apparatus according to a variation of the first embodiment of the present invention.

FIG. 8 is a flowchart showing a basic operation of the moving object detection apparatus according to the variation of the first embodiment of the present invention. Note that Steps S101 to S104 in the figure are the same as Steps S101 to S104 in FIG. 3, and thus the description thereof will be omitted.

Figure 9:
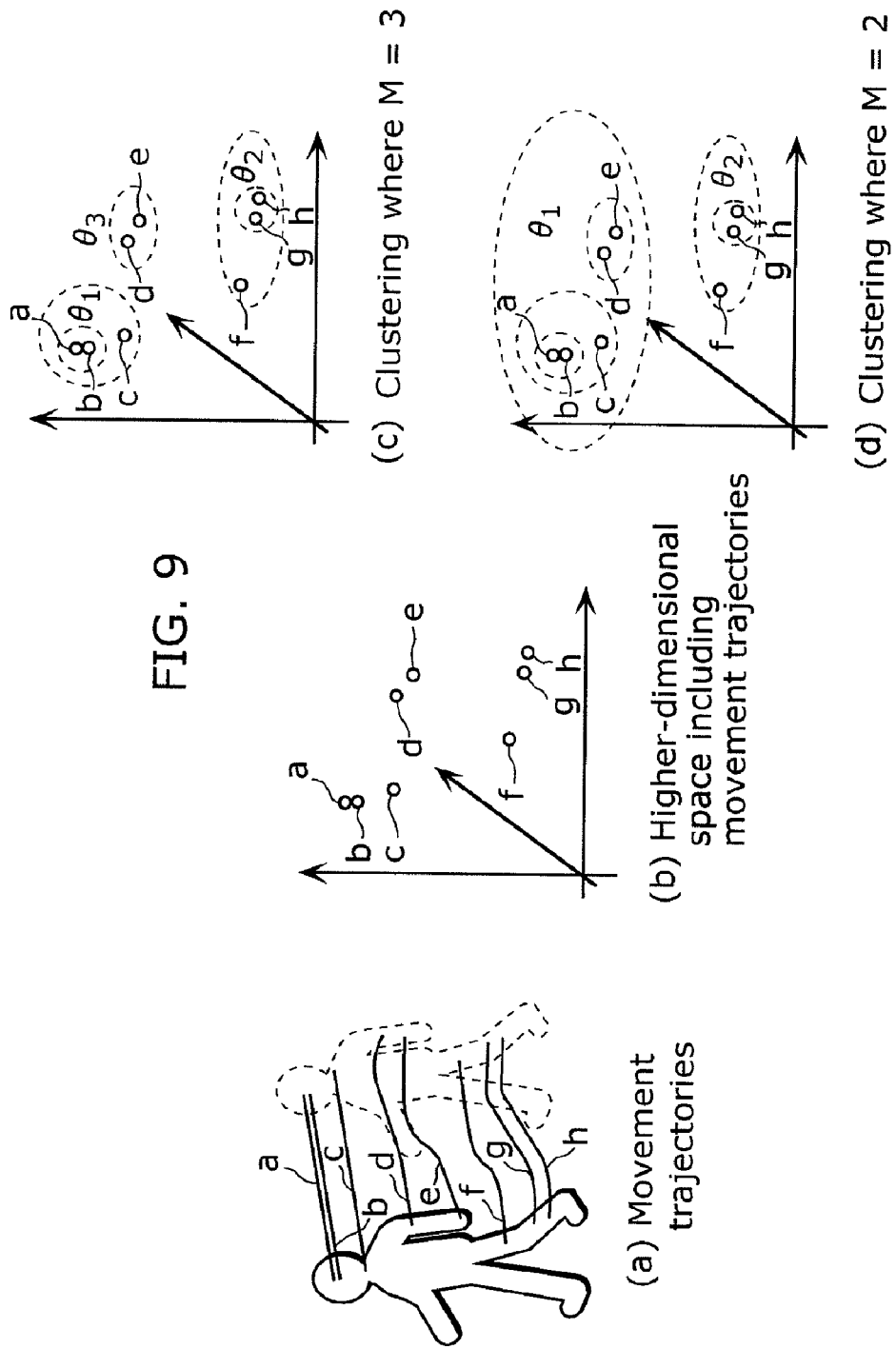
FIGS. 9(a) to (d) is a diagram showing an example of processing performed by the segmentation unit according to a variation of the first embodiment of the present invention.

The segmentation unit 104 according to the present variation performs Steps S205 (clustering) and S206 (labeling). In Step S205, the segmentation unit 104 performs clustering by repeating the processing for concatenating the movement trajectories i and j into the same class in ascending order of f(i, j), using the distance f(i, j) between the movement trajectories i and j that is calculated by Expression 3 or 4 above. As FIG. 9(a) shows, the movement trajectories from a to h significantly vary according to posture changes even if they are of the same moving object. However, as long as the object is articulated with joints, it is possible to assume that the movement trajectories in the neighborhood in particular have high similarity. Here, high similarity means that the distance f(i, j) between the movement trajectories i and j is small. Furthermore, a small f(i, j) can be interpreted as a short distance between the movement trajectories i and j distributed on the higher-dimensional space including the movement trajectories. FIG. 9(b) is a conceptual diagram of the higher-dimensional space representing the movement trajectories from a to h. Note that to simplify the description, the conceptual diagram is based on a three-dimensional space, but in practice, each element in the vector shown in Expression 2 above corresponds to each dimension. Note that there are eight movement trajectories from a to h, but in practice, a movement trajectory corresponding to each pixel may be used, and a movement trajectory calculated on a per-block basis may be used. Here, one point indicating one of the movement trajectories from a to h on the higher-dimensional space corresponds to the one movement trajectory expressed in Expression 2 above. That is, the point in the higher-dimensional space is a result of going through not only a region on a single picture but pixels for temporally different pictures. Furthermore, on the higher-dimensional space, a point-to-point distance does not correspond to the Euclidean distance between vectors, but corresponds to the distance as expressed in Expression 3 or 4 above.

Then, the segmentation unit 104 performs clustering based on the discontinuity of the distance between the movement trajectories by performing clustering on the movement trajectories according to the continuity in the distribution on the higher-dimensional space including the movement trajectories. As a result, it can be expected that each cluster corresponds to each individual moving object or a part of the moving object, thus making it possible to detect the moving object and perform segmentation.

First, each region to be generated by the segmentation is expressed as follows.

[Math. 21]

$$\theta = \{\theta_1, \ldots \theta_m \ldots \theta_M\} \quad \text{(Expression 21)}$$

Here, M is the number of regions and empirically determined according to the scene in which it is to be used.

First, processing is performed for classifying the movement trajectory i and the movement trajectory j into the same region label $\theta_m$ in ascending order of f(i, j), excluding the distance f(i, j) between identical movement trajectories. In performing this processing, when one of the movement trajectory i and the movement trajectory j already belongs to a region $\theta_k$, a pixel that is not yet assigned with a region label is also made to belong to the region $\theta_k$. Furthermore, when the movement trajectory i and the movement trajectory j already belong to different regions, the region labels are integrated.

In Step S206, the segmentation unit 104 labels all the movement trajectories processed in Step S205, and determines whether or not the number of regions is M as defined. Here, when the condition in Step S206 is not satisfied, the segmentation unit 104 repeats the processing in Step S205 for classifying the movement trajectory i and the movement trajectory j into the same region label $\theta_m$ in ascending order of f(i, j). Note that when the number of the movement trajectories belonging to each region is equal to or less than the number of N thresholds, the number may be excluded from the region as an outlier.

Here, a specific example of the processing in Steps S205 and S206 will be described with reference to FIGS. 9(c) and (d). The cases where M=2 and where M=3 are described. Here, in the example shown in FIG. 9(b), f(a, b)<f(g, h)<f(d, e)<f(b, c)<f(f, g)<f(c, d) where f(a, b) is the distance between the movement trajectory a and the movement trajectory b. First, an example of M=2 will be described with reference to FIG. 9(c). Here, in Step S205, since the distance f(a, b) between the movement trajectories a and b is the smallest, the segmentation unit 104 assigns the same region label $\theta_1$ to the movement trajectories a and b. Next, since the distance f(g, h) between the movement trajectory g and the movement trajectory h is the second smallest, the segmentation unit 104 assigns the same region label $\theta_2$ to the movement trajectories g and h. Furthermore, to the third smallest distance between the movement trajectory d and the movement trajectory e, the segmentation unit 104 assigns the same region label $\theta_3$. The next smaller distance is the distance f(b, c) between the movement trajectory b and the movement trajectory c. Here, since the movement trajectory b is already labeled, the segmentation unit 104 assigns to the movement trajectory c, the same region label $\theta_1$ as the movement trajectory b. The next smaller distance is the distance f(f, g) between the movement trajectory f and the movement trajectory g. Here, as in the case of f(b, c), the segmentation unit 104 assigns to the movement trajectory f, the same region label $\theta_3$ as the movement trajectory g. Here, where M=3, all the movement trajectories are assigned with labels in Step S206 and it is judged that M=3, so that the output unit 105 outputs a result of the labeling to each of the movement trajectories, and thus the processing is completed.

On the other hand, where setting is M=2, there is a case where the condition is not satisfied in Step S206. Thus, again in Step S205, the segmentation unit 104 integrates, for the movement trajectories c and d having the next smaller distance, the region label $\theta_1$ that the movement trajectory c belongs to and the region label $\theta_3$ that the movement trajectory d belongs to, and assigns the region label $\theta_1$ to the movement trajectories from a to e. Then, in Step S206, the segmentation unit 104 assigns labels to all the movement trajectories and judges that M=2, so that the output unit 105 outputs a result of the labeling to each of the movement trajectories, and thus the processing is completed.

Thus, according to the present variation of the first embodiment, it is possible to perform segmentation considering the pixel position and motion similarity by calculating a distance as expressed in Expression 3 or 4 above. Thus, in the example shown in FIGS. 9(*a*) to (*d*), where M=2, a significant difference between a lower-body motion and an upper-body motion is reflected, so that motions are separated into the upper-body motion and the lower-body motion. Furthermore, where M=3, in addition to the case of M=2, the difference between the head motion and the arm motion is reflected, so that the motions can be separated into motions of the upper body, the arms, and the lower body.

Thus, by sequentially assigning region labels to similar movement trajectories, it is possible to determine, as one cluster, movement trajectories that are continuous on the higher-dimensional space, and to separate the movement trajectories into clusters, based on the discontinuity point at which the distance between the movement trajectories is large. As a result, the movement trajectories belonging to each cluster correspond to results of the moving object detection and the segmentation.

It goes without saying that the present method allows, in the same manner, not only detecting body parts of the moving object and performing segmentation but also detecting each moving object and performing segmentation in a scene where more than one person is present.

As described above, since segmentation is performed on similar movement trajectories classified by the clustering based on the inter-pixel distance or the similarity between the movement trajectories, regions having smaller distances and similar motions are recognized as one region, and, as a result of temporally going through the regions of the object moving in the video, it is possible to detect a moving object in the video or the regions of the moving object and to perform segmentation on the image including the moving object, irrespective of postures of the articulated object. In addition, since the clustering is performed based on the similarity between movement trajectories without requiring setting of a human candidate region as preprocessing, no failure occurs in detecting the human candidate region, which becomes a problem particularly when moving objects having various sizes are present in the image or when a part of the moving object is occluded, nor does such false detection cause a failure in segmentation.

As above, by performing clustering in a nonlinear space without requiring fitting of a vast quantity of parameters, it is possible to accurately perform segmentation on the video including a person that moves changing shape, to thereby detect the moving object in the video.

[Embodiment 2]

Next, another method for realizing the segmentation performed on the nonlinear space according to the first embodiment above in a manner different from the first embodiment will be described as a second embodiment.

Figure 10:
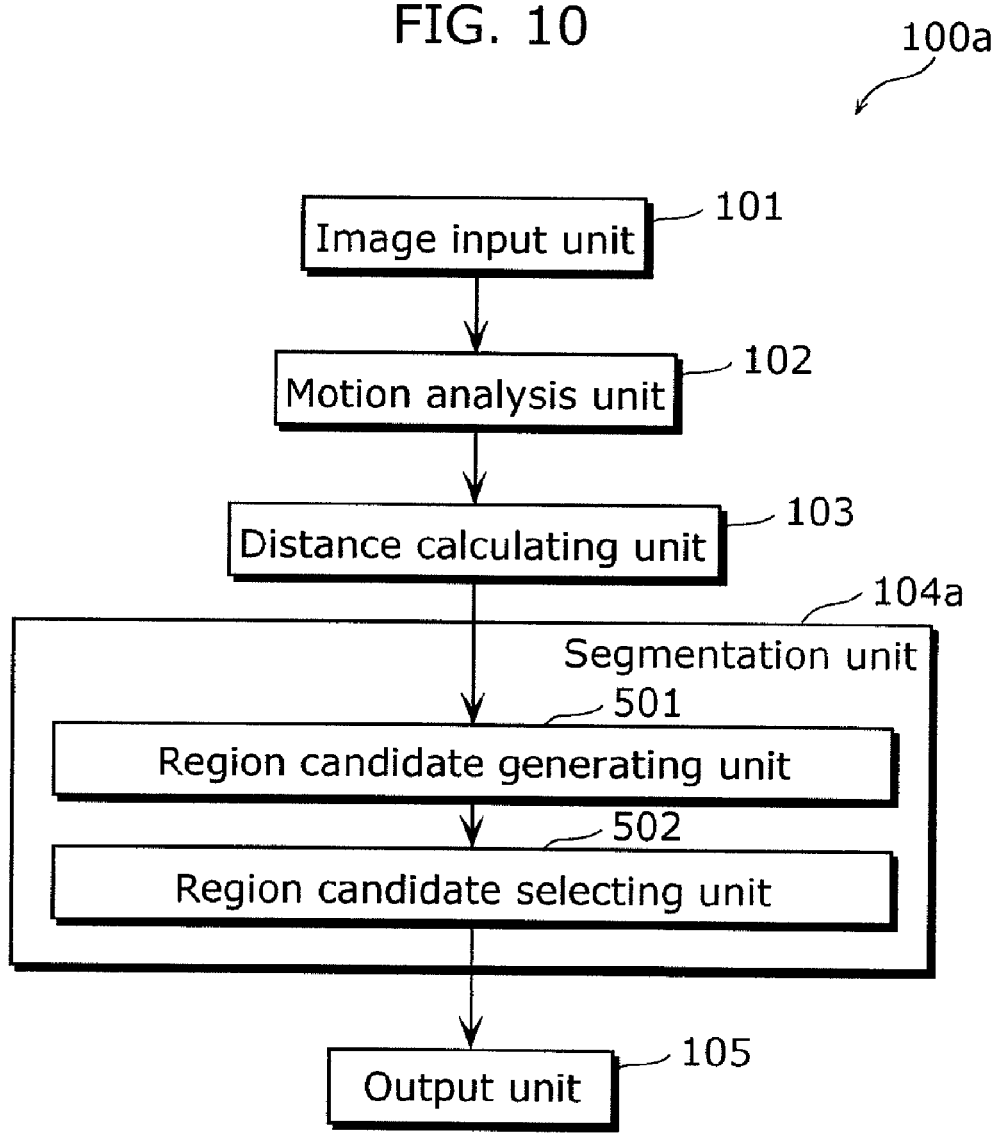
FIG. 10 is a functional block diagram showing a basic configuration of a moving object detection apparatus according to a second embodiment of the present invention.

FIG. 10 is a functional block diagram showing a basic configuration of a moving object detection apparatus 100*a* according to the second embodiment of the present invention. The moving object detection apparatus 100*a*, as shown in FIG. 10, includes: an image input unit 101, a motion analysis unit 102, a distance calculating unit 103, a segmentation unit 104*a* (a region candidate generating unit 501 and a region candidate selecting unit 502), and an output unit 105. Since the image input unit 101, the motion analysis unit 102, and the distance calculating unit 103 are the same as in the first embodiment, the description thereof will be omitted.

The segmentation unit 104*a* is the same as the segmentation unit 104 according to the first embodiment in that both perform segmentation by specifying, based on distances calculated by the distance calculating unit 103, a region including blocks having similar movement trajectories, but the segmentation unit 104*a* is different in specific processing. Accordingly, the segmentation unit 104*a* includes the region candidate generating unit 501 and the region candidate selecting unit 502.

The region candidate generating unit 501 is a processing unit which generates determination criteria to be used for segmentation, performs segmentation on each of the generated determination criteria by clustering, using each of the determination criteria, the movement trajectories calculated by the motion analysis unit 102, and then generates a result of the segmentation as a region candidate. Specifically, the region candidate generating unit 501: applies the geodetic distance transformation to the distance matrix calculated by the distance calculating unit 103, using a threshold related to data continuity, which is, in other words, to transform each of the distances calculated by the distance calculating unit 103 into the geodetic distance by combining distances smaller than the threshold from among the distances calculated by the distance calculating unit 103; detects a discontinuity point, with respect to the threshold, in the distribution of the distance between the movement trajectories after the geodetic distance transformation; and clusters movement trajectories that are continuously distributed, so as to perform clustering, as one cluster, movement trajectories separate from each other at a geodetic distance shorter than the detected discontinuity point, so as to generate a candidate for the segmentation to be performed with respect to the threshold. Here, the number of regions resulting from the segmentation varies depending on the setting of the threshold.

The region candidate selecting unit 502 is a processing unit which obtains an instruction for the number of classes (or a predetermined number of classes) and selects, from among plural region candidates generated by the region candidate generating unit 501, a region candidate that is divided into the number of regions that is close to the obtained number of classes, so as to output the selected region candidate as a result of the segmentation, based on the distances calculated by the distance calculating unit 103. Specifically, the region candidate selecting unit 502 selects a result of the segmentation that is closest to the predetermined number of classes, from among the region candidates generated by the region candidate generating unit 501 for each of the thresholds. That is, the result of the segmentation using the threshold according to the number of classes is to be selected.

The output unit 105 is the same as in the first embodiment. With an output from the output unit 105, a final result of the moving object detection and the segmentation can be obtained.

Figure 11:
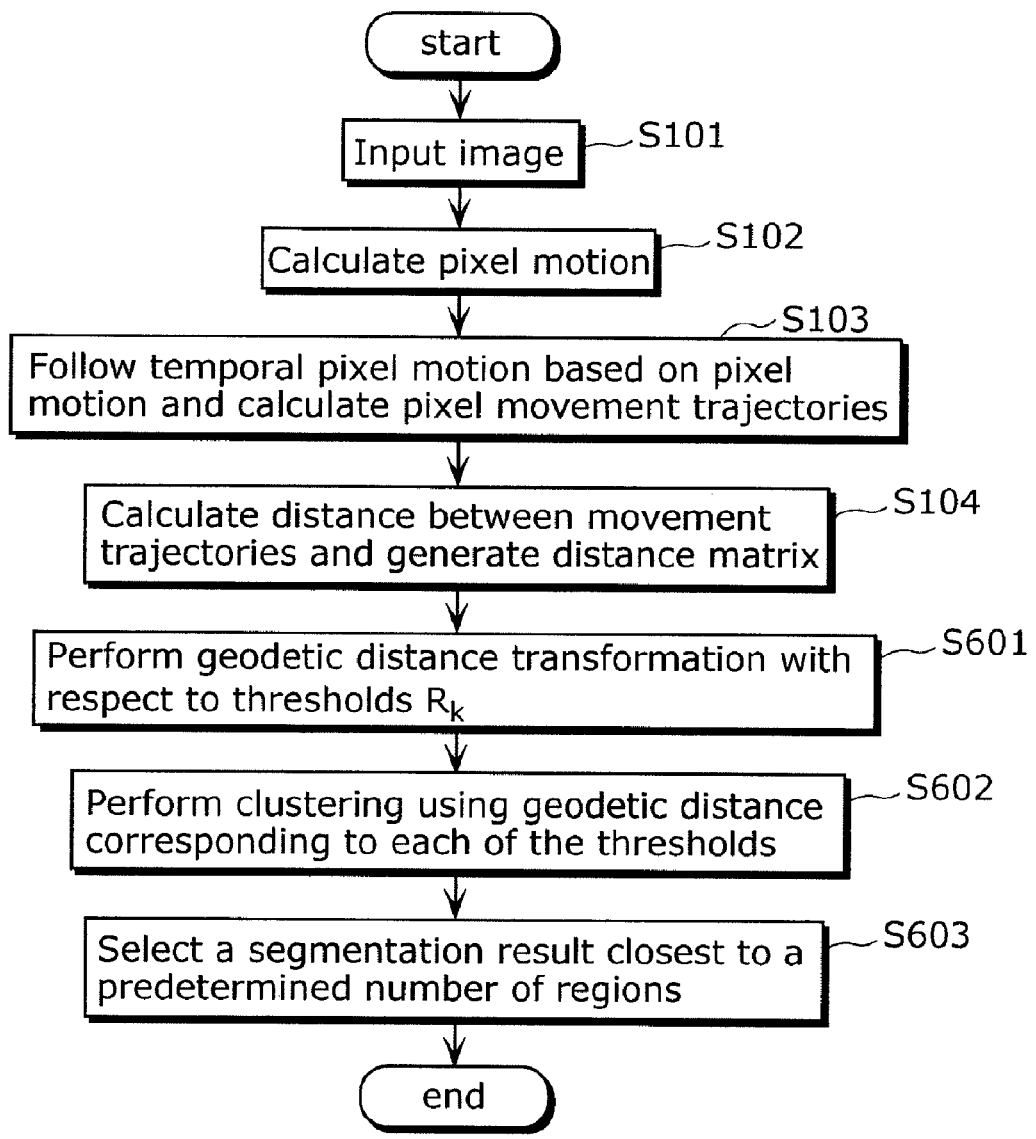
FIG. 11 is a flowchart showing a basic operation of the moving object detection apparatus according to the second embodiment of the present invention.

Hereinafter, the moving object detection method according to the present invention, that is, an operation of the moving object detection apparatus 100a will be described in detail with reference to a flowchart in FIG. 11, using an example of detecting a moving object that moves and performing segmentation. Since Steps S101 to S104 are the same as in the first embodiment, the description thereof will be omitted.

The region candidate generating unit 501 performs Step S601 (geodetic distance transformation) and Step 602 (clustering). In Step S601, the region candidate generating unit 501 performs nonlinearization on each of the thresholds $R_k$, to calculate f'(i, j), using K thresholds $R_k$ for the linear distance f(i, j) calculated by Expression 3 or 4 above.

(Expression 22)

$$f'_k(i, j) = \begin{cases} f(i, j) & \text{if } i \text{ is } R_k - NearestNeighbor \\ \infty & \text{otherwise} \end{cases} \quad [\text{Math. 22}]$$

In other words, the region candidate generating unit 501 selects $R_k$ movement trajectories j in ascending order of the linear distance from a current movement trajectory i, and does not change the distances from the selected movement trajectories j, and changes the distance from an unselected movement trajectory j into an infinite value. Note that here the movement trajectories were selected in ascending order of the linear distance f(i, j), but the thresholds $R_k$ may be set as in the following expression.

(Expression 23)

$$f'_k(i, j) = \begin{cases} f(i, j) & \text{if } f(i, j) < R_k \\ \infty & \text{otherwise} \end{cases} \quad [\text{Math. 23}]$$

In other words, as shown in Expression 22 above, the region candidate generating unit 501 may select, for each of the movement trajectories calculated by the motion analysis unit 102, a predetermined number of movement trajectories in ascending order of the distance, and may transform respective distances into geodetic distances after performing nonlinearization to transform a distance from the unselected movement trajectory into infinite values; alternatively, as shown in Expression 23 above, the region candidate generating unit 501 may select, for each of the movement trajectories calculated by the motion analysis unit 102, a movement trajectory located at a distance equal to or smaller than a predetermined threshold and transform the respective distances into geodetic distances after performing nonlinearization to transform the distance from the unselected movement trajectory into an infinite value.

Note that a technique of nonlinearizing distances is not limited to the functions described above, but may be anything that performs nonlinearization on the distance related to the movement trajectories i and j.

Furthermore, processing according to Expression 22 or 23 above may be performed, after weighting the linear distance f(i, j) by multiplying it by the weight calculated by Expressions 16 and 17 above.

By transforming f(i, j) using the weight in Expressions 17 and 18 above, f(i, j) becomes relatively small when the movement trajectories similar to the movement trajectories i and j are spatially concentrated (when the distance between the movement trajectories is small), and f(i, j) becomes relatively large when the movement trajectories similar to the movement trajectories i and j are spatially dispersed (when the distance between the movement trajectories is large). In other words, when transforming each of the distances calculated by the distance calculating unit 103, the transformation into the geodesic distance is performed by weighting such that the geodesic distance becomes smaller for a larger density in the distribution of the movement trajectories calculated by the motion analysis unit 102. With this, it is possible to perform distance transformation considering the density of distribution of the movement trajectories of pixels.

Next, the region candidate generating unit 501 calculates the geodesic distance as in the following expression, using distance $f'_k(i, j)$ that is nonlinearized.

[Math. 24]

$$g_k(i, j) = \min(f'_k(i, j), f'_k(i, s) + f'_k(s, j)) \quad (\text{Expression 24})$$

Note that min(x, y) is a function which returns a smaller one of the value x and the value y. In addition, s is a movement trajectory s and is a relay point to pass through in order to reach the movement trajectory j from the movement trajectory i. Here, the relay point s in $f'_k(i, s) + f'_k(s, j)$ is not limited to one point. Note that k corresponds to the thresholds $R_k$. This method, as described earlier, is a shortest path search method known as Dijkstra method.

Next, in Step S602, the region candidate generating unit 501 performs clustering by detecting the discontinuity point, using $g_k(i, j)$ resulting from the geodesic distance transformation corresponding to each of the thresholds $R_k$. Here, the discontinuity point is where $g_k(i, j)$ becomes infinite between the movement trajectory i and the movement trajectory j. An example of results of the geodesic distance transformation obtained for the thresholds $R_k$ will be described with reference to FIGS. 12(a) to (f). Here, FIG. 12(a) is a diagram showing movement trajectories from a to h, and FIG. 12(b) is a conceptual diagram of the higher-dimensional space, which shows the movement trajectories from a to h shown in FIG. 12(a). Note that there are eight movement trajectories from a to h, but in practice, movement trajectories corresponding to each pixel may also be used, or a movement trajectory calculated on a per-block basis may also be used. Here, a point indicating one of the movement trajectories from a to h in the higher-dimensional space corresponds to a movement trajectory expressed in Expression 2 above. That is, the points in the higher-dimensional space are a result of going through not only a region on a single picture but also pixels for temporally different pictures. Furthermore, on the higher-dimensional space, a point-to-point distance does not correspond to the Euclidean distance between vectors but corresponds to the geodesic distance as expressed in Expression 21 above.

In the case where the thresholds $R_k$ are sufficiently large, for example, where the thresholds $R_k$ are larger than a maximum value of f(i, j) in Expression 16 above, the geodetic distance $g_k(i, j)$ does not become infinite in every combination of i and j as shown in FIG. 12(c). That is, since there is no discontinuity point, it can be judged that there is one cluster. On the other hand, in the case where the thresholds $R_k$ are sufficiently small, specifically, where the thresholds $R_k$ are smaller than a minimum value of f(i, j) in Expression 16 above, the geodetic distance $g_k(i, j)$ becomes infinite in every combination of i and j. That is, the number of clusters is equal to the number of movement trajectories. Here, it is efficient to set the thresholds $R_k$ to a value between the maximum and minimum values of f(i, j) and perform clustering on each of the thresholds $R_k$. An example shown in FIG. 12(d) will be described. Here, in FIG. 12(b), f(e, f)>f(c, d)>f(f, g)>f(b, c) where f(a, b) is the distance between the movement trajectory a and the movement trajectory b as expressed in Expression 3 or 4 above. In addition, when $R_1$ is set as the threshold, the distance f(e, f) has a larger value than the threshold $R_1$. In this case, when the geodetic distance is calculated by Expression 18 above, $g_1(e, f)$ becomes infinite. Thus, the region candidate generating unit 501 determines that the discontinuity point is between the movement trajectories e and f. As a result, the geodetic distance between each of the movement trajectories from a to d and the movement trajectory e does not pass through the discontinuity point and thus does not have an infinite value, whereas the geodetic distance between each of the movement trajectories f to h and each of the movement trajectories a to e passes through the discontinuity point $g_1(e, f)$ and thus becomes infinite. Thus, the region candidate generating unit 501 classifies, into the same cluster, pairs of the movement trajectories i and j not having an infinite geodetic distance, and classifies pairs having an infinite geodetic distance into another cluster. With this, it is possible to separate the movement trajectories into two clusters $\theta_1$ and $\theta_2$. Furthermore, here, as shown in FIG. 12(e), it is assumed that geodetic distances $g_2(c, d)$, $g_2(e, f)$, and $g_2(f, g)$ become infinite when $R_2$ is the threshold (however, $R_1 > R_2$). In this case, the region candidate generating unit 501 determines that the discontinuity points are present between the movement trajectories c and d, between the movement trajectories e and f, and between the movement trajectories f and g, and classifies pairs having an infinite geodetic distance and pairs not having an infinite geodetic distance as in the example shown in FIG. 12(d), to separate the pairs into a total of four clusters $\theta_1$, $\theta_2$, $\theta_3$, and $\theta_4$. With the processing described above, the segmentation unit 104 can determine that the pairs of movement trajectories not having an infinite geodetic distance are continuous and thus belong to the same cluster, and can perform the separation into clusters based on the discontinuity point by determining that the pairs of movement trajectories having infinite distance are discontinuous. Note that the method of setting the thresholds $R_k$ produces an advantageous effect of reducing the risk of determining all the movement trajectories as one cluster or determining the respective movement trajectories as separate clusters by setting K thresholds at equal intervals from the minimum value of f(i, j) to the maximum value. In other words, the region candidate generating unit 501 may generate, as thresholds for generating region candidates, thresholds between the maximum value and the minimum value in the distances calculated by the distance calculating unit 103.

Furthermore, a value increased or decreased at a given interval centering on a mean value or a median of f(i, j) may be used. When the value of f(i, j) is relatively even, it is possible to determine a threshold that corresponds to the discontinuity point more efficiently. In other words, the region candidate generating unit 501 may generate, as thresholds for generating region candidates, values obtained by increasing or decreasing the distances calculated by the distance calculating unit 103, centering on the mean value or the median of the distances.

In addition, by decreasing the maximum value at given intervals, K−1 smaller values may be determined as thresholds, based on the value detected when the discontinuity point was initially detected. This produces an advantageous effect of eliminating the risk of determining all the movement trajectories as one cluster.

Furthermore, Steps S601 and S602 may be repeated making the thresholds $R_k$ smaller. For example, as in the example shown in FIG. 12(d), the region candidate generating unit 501 can: perform, in Steps S601 and S602, clustering on the movement trajectories, using the threshold $R_1$; then, in Step S601, transform f(i, j) corresponding to each of the clusters extracted using the threshold $R_1$ (where i and j are movement trajectories belonging to the same cluster), using a threshold $R_2$ that is smaller than the threshold $R_1$ as shown in an example in FIG. 12(e); and in Step S602 can perform clustering by detecting discontinuity points from g(i, j) corresponding to each of the clusters (where i and j are movement trajectories belonging to the same cluster). Thus, by performing transformation into the geodetic distance and detection of the discontinuous point for each of the movement trajectories belonging to each cluster while concurrently making the thresholds $R_k$ smaller, it is possible to perform hierarchical clustering as shown in FIG. 12(f). Naturally, reversely, it is also possible to perform hierarchical clustering by performing clustering, increasing the threshold starting from a smaller value. However, a technique of decreasing the thresholds from a larger value to a smaller value produces an advantageous effect of allowing processing with a smaller amount of calculation because it is sufficient to perform, using a smaller threshold, transformation into the geodetic distance and detection of the discontinuity point only on the clusters extracted using a larger threshold. Specifically, as shown in FIG. 12(f), since the clustering with the threshold $R_2$ only needs clustering of each of the clusters extracted with the threshold $R_1$, it is possible to reduce the total size of f(i, j) (where i and j are movement trajectories belonging to the same cluster) used for the calculation. Accordingly, this requires a smaller amount of calculation.

Figure 13:
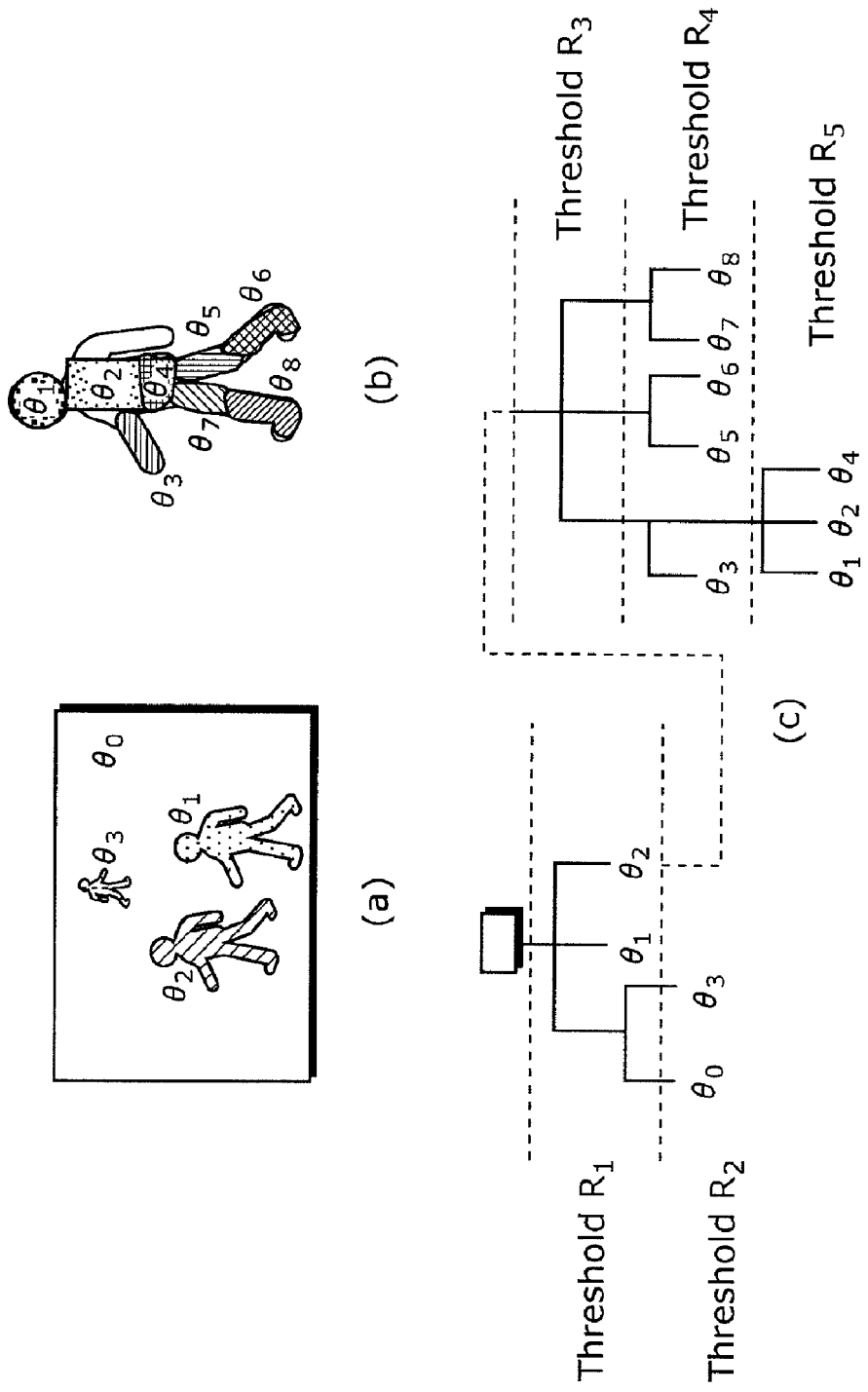
FIGS. 13(a) to (c) is a diagram showing an example of hierarchical clustering performed by the segmentation unit according to the second embodiment of the present invention.

In addition, by performing hierarchical clustering as described above, as shown in FIGS. 13(a) to (c), it is possible to represent a scene structure as a tree structure. For example, performance of clustering with threshold $R_1$ on an input of FIG. 13(a) results in clusters $\theta_1$ and $\theta_2$ extracted as shown in FIG. 13(c). Furthermore, by performing clustering with a smaller threshold $R_2$, it is possible to extract $\theta_3$ which is a smaller object. Thus, since an object more distant from the camera or an object having a small motion is extracted using a smaller threshold, there is an advantageous effect of obtaining such a scene structure as a hierarchical structure. For example, it is possible to expect a risk of collision or the like in the value of the threshold. Note that $\theta_0$ corresponds to a background. Here, when the camera is fixed, it is possible to extract only a moving object by using only the movement trajectory having a motion, and when the camera is moving, a cluster having a largest number of movement trajectories may be used as the background.

Furthermore, an example of clustering performed with thresholds smaller than the thresholds in the above example will be described with reference to FIG. 13(b). Here, the cluster $\theta_2$ will be described for sake of simplicity, but the clustering may be performed on all the clusters using a smaller threshold, or on a cluster (object) specified by a user. First, performance of clustering on $\theta_2$ with a smaller threshold $R_3$ results in regions which can be classified into: the right leg, the left leg, and the upper body as shown on the right of FIG. 13(c). Generally, since walking requires a larger motion of legs, the legs are extracted using a larger threshold than the other regions. Furthermore, when performing clustering with a smaller threshold $R_3$, the right and left legs are classified into upper thighs ($\theta_5$, $\theta_7$) and lower thighs ($\theta_6$, $\theta_8$), and arms ($\theta_3$) are extracted from the upper body. Furthermore, when performing clustering with a smaller threshold $R_5$, it is possible to cluster the upper body into: a head region ($\theta_1$), a chest region ($\theta_2$), and an abdominal region ($\theta_4$). As above, it is possible to perform the clustering based on the hierarchical structure reflecting discontinuity in motion. This produces an advantageous effect of enabling the user to watch the motion of each region of the object with a desired granularity.

That is, in the case of reducing the thresholds in the processing, a hierarchical clustering which reflects the distribution of all the movement trajectories can be realized by performing more detailed clustering using a smaller threshold on each of the clusters that are once extracted.

In addition, the region candidate generating unit 501 detects an initial discontinuity point among the distances calculated by the distance calculating unit 103 when arranged in an order from the largest value to the smallest value, and generates values smaller than the detected discontinuity point as thresholds for generating region candidates.

Furthermore, the thresholds $R_k$ may be set as follows: first, the movement trajectory i and the movement trajectory j that is the Nth smaller may be calculated, and the calculated values may be set as the thresholds $R_k$, so as to perform the processing in descending order of $R_k$. In this case, assuming, for example, that N is a value obtained by dividing the number of movement trajectories used for the processing by the number of clusters that is intended to be set, there is an advantageous effect of facilitating the setting of the thresholds $R_k$ which allows the number of clusters closer to the desired number of clusters. That is, the region candidate generating unit 501 may specify, for each of the movement trajectories calculated by the motion analysis unit 102, Nth smaller distances from each of the movement trajectories, and may generate values selected for the specified distances in descending order, as thresholds for generating region candidates.

Next, in Step S603, the region candidate selecting unit 502 selects a clustering result having the cluster number closest to a predetermined class number, from among results of the clustering performed in Step S602. To give an example shown in FIGS. 12(a) to (f), when the class number=4 is set, a clustering result at the time of the threshold $R_2$ (FIG. 12(e)) is selected. In addition, when the class number=2 is set, a clustering result at the time of the threshold $R_1$ is selected (FIG. 12(c)), and the output unit 105 outputs the result in which each of the movement trajectories is labeled.

Note that according to the present embodiment, it is possible to perform segmentation considering the pixel position and motion similarity, by calculating the distance as expressed in Expression 3 or 4 above. Accordingly, in the example shown in FIGS. 12(a) to (f), when the class number M=2 is set, a significant difference between motions of the lower body and the upper body is reflected, so that the upper and the lower bodies can be divided into regions as separate clusters; and when the class number M=4 is set, differences between motions of the head region and the arms, and between motions of the upper and lower thighs are reflected in addition to the case where M=2, so that the head region, the arms, the upper thighs, and the lower thighs can be divided into regions as separate clusters.

Note that here the number of the thresholds is not limited to two, but several kinds of thresholds may be provided. In addition, when the same number of clustering results as the predetermined class number is not obtained, a closest number of clusters may be selected, or a clustering result indicating the closest number of clusters among class numbers smaller than the predetermined class number may be selected; likewise, a clustering result indicating the closest number of clusters among class numbers larger than the predetermined class number may be selected.

In addition, by using the thresholds $R_k$, as shown in FIG. 12(f), there is an advantageous effect of obtaining, as a hierarchical structure, the clustering result at the time of the threshold $R_1$ and the clustering result at the time of the threshold $R_2$. For example, in the clustering where M=2 and $R_1$ is the threshold, the movement trajectories are divided into the upper and lower bodies, and in the clustering where M=4 and $R_2$ is the threshold, the object is divided into respective body parts such as the head and arms. Here, the cluster $\theta_1$ separated as the upper body using the threshold $R_1$, the cluster $\theta_1$ separated as the head region using the threshold $R_2$, and the cluster $\theta_4$ separated as the arms can be obtained as a hierarchical relationship as shown in FIG. 12(f). Thus, it is also possible to extract a structure of the object in the image as a hierarchical structure.

Furthermore, the present method allows, in the same manner, not only detecting body parts of the moving object and performing segmentation but also detecting each moving object and performing segmentation in a scene where more than one person is present.

As above, by performing the clustering on the plural thresholds, based on the discontinuity point calculated using the geodetic distance, and selecting the clustering result closest to the predetermined number, it is possible, as a result, to detect the moving object and perform segmentation.

As described above, since segmentation is performed on similar movement trajectories classified by the clustering based on the inter-pixel distance or the similarity between the movement trajectories, regions having smaller distances and coherent motions are recognized as one region, and, as a result of temporally going through the region of the object moving in the video, it is possible to detect the moving object in the video or the regions of the moving object, and to perform segmentation on the image including the moving object, irrespective of postures of such an articulated object. In addition, since the clustering is performed based on the similarity between movement trajectories and using plural thresholds without requiring setting of a human candidate region as preprocessing, no failure occurs in detecting the human candidate region, which becomes a problem particularly when moving objects having various sizes are present in the image or when a part of the moving object is occluded, nor does such false detection cause a failure in segmentation.

Furthermore, since the clustering based on the discontinuity point according to the present embodiment allows clustering that is not influenced by the cluster size, it is possible to reliably extract the clusters in the case where a large object and a small object are mixed together or where an object having a large motion and an object having a small motion are mixed together. In addition, since the clustering performed by gradually reducing the thresholds allows hierarchical clustering that ranges from rough clustering to detail clustering, it is possible to hierarchically extract the scene structure or a body structure of the object. This likewise produces an advantageous effect of allowing an analysis which ranges from an analysis of a coarse image for extracting a location of the object in the image, to a detailed analysis of a specific image region or object region. In addition, since the extracted hierarchical structure is to show a data structure of all the movement trajectories, it is also possible to represent the structure of the scene in the input image.

As above, by performing clustering in a nonlinear space without requiring fitting of a vast quantity of parameters, it is possible to accurately perform segmentation on the video including a human object that moves changing shape, to thereby detect the moving object in the video.

[Variation 1 of Embodiments 1 and 2]

Figure 14:
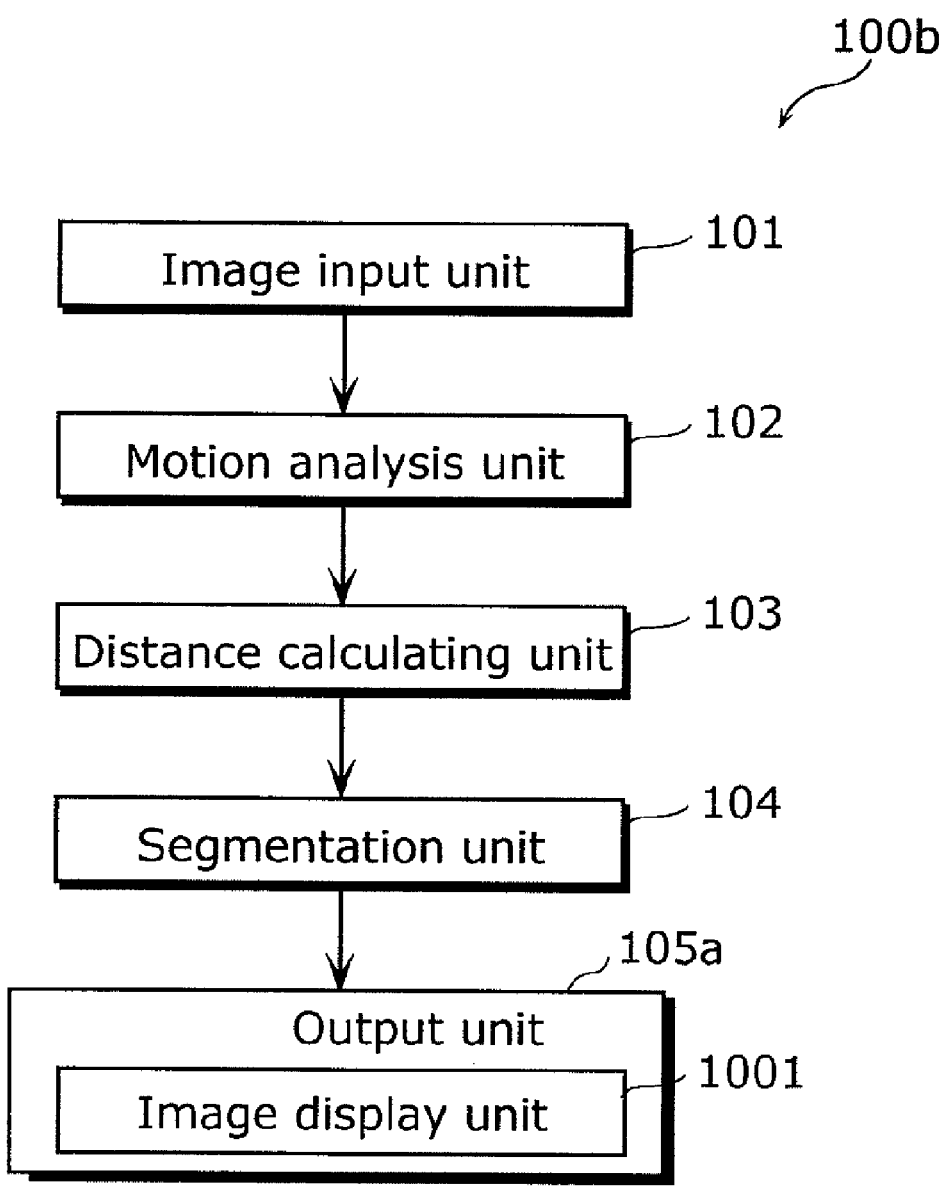
FIG. 14 is a functional block diagram showing an example of a configuration of the moving object detection apparatus according to a first variation of the first and the second embodiments of the present invention.

Next, a moving object detection apparatus according to a first variation of the first and the second embodiments will be described. Here described is an example in which a function to display, as an image, a result of the detection and segmentation performed on a moving object is added. Here, a variation in the first embodiment will lo be described, but it is also applicable in the variation of the first embodiment, and the second embodiment. A moving object detection apparatus 100b according to the first variation, as shown by a functional block diagram in FIG. 14, includes: the image input unit 101, the motion analysis unit 102, the distance calculating unit 103, the segmentation unit 104, and an output unit 105a. Here, the output unit 105a has an image display unit 1001, in addition to the function of the output unit 105 according to the first embodiment, and the image display unit 1001 can display, as an image, separate regions resulting from the segmentation.

The image display unit 100 is a processing unit which displays the result of the segmentation performed by the segmentation unit 104 by superimposing the result onto the video (picture) entered at the image input unit 101, and includes, for example, a display such as an LCD or the display control unit thereof. FIGS. 15(a) and (b) is a diagram showing an example of display by the image display unit 1001. Here, FIG. 15(a) shows an example of segmentation performed on the moving object where M=3, and FIG. 15(b) shows an example of segmentation performed on the moving object where M=8. Thus, the regions resulting from the segmentation on the image and each corresponding to regions $\theta_m$ are marked in different colors so as to be distinctive, and displayed on the monitor or the like. As FIG. 15(a) shows, each object may be displayed in a different color, or as FIG. 15(b) shows, each region may be separately displayed. That is, as is clear from FIGS. 15(a) and (b), the moving object detection apparatus according to the present invention can detect moving objects through the segmentation described above (FIG. 15(a)), and can also detect regions included in one moving object, that is, can also divide the one moving object into regions (FIG. 15(b)).

Here, the movement trajectory i expressed in Expression 2 above corresponds to one of the regions $\theta_m$ except for an outlier. Thus, it is possible to easily display the regions resulting from the segmentation on the image by selecting pixels on the picture, according to the movement trajectory i belonging to a corresponding one of the regions $\theta_m$ and then marking the pixels in a different color based on the region label. In addition to the advantageous effect described in the first and the second embodiments, which allows correct performance of segmentation even on video including a person that moves changing shape, this produces another advantageous effect of allowing the user to easily differentiate each moving object or each region of the moving object and further the motions thereof by displaying the separate regions onto the video.

[Variation 2 of Embodiments 1 and 2]

Figure 16:
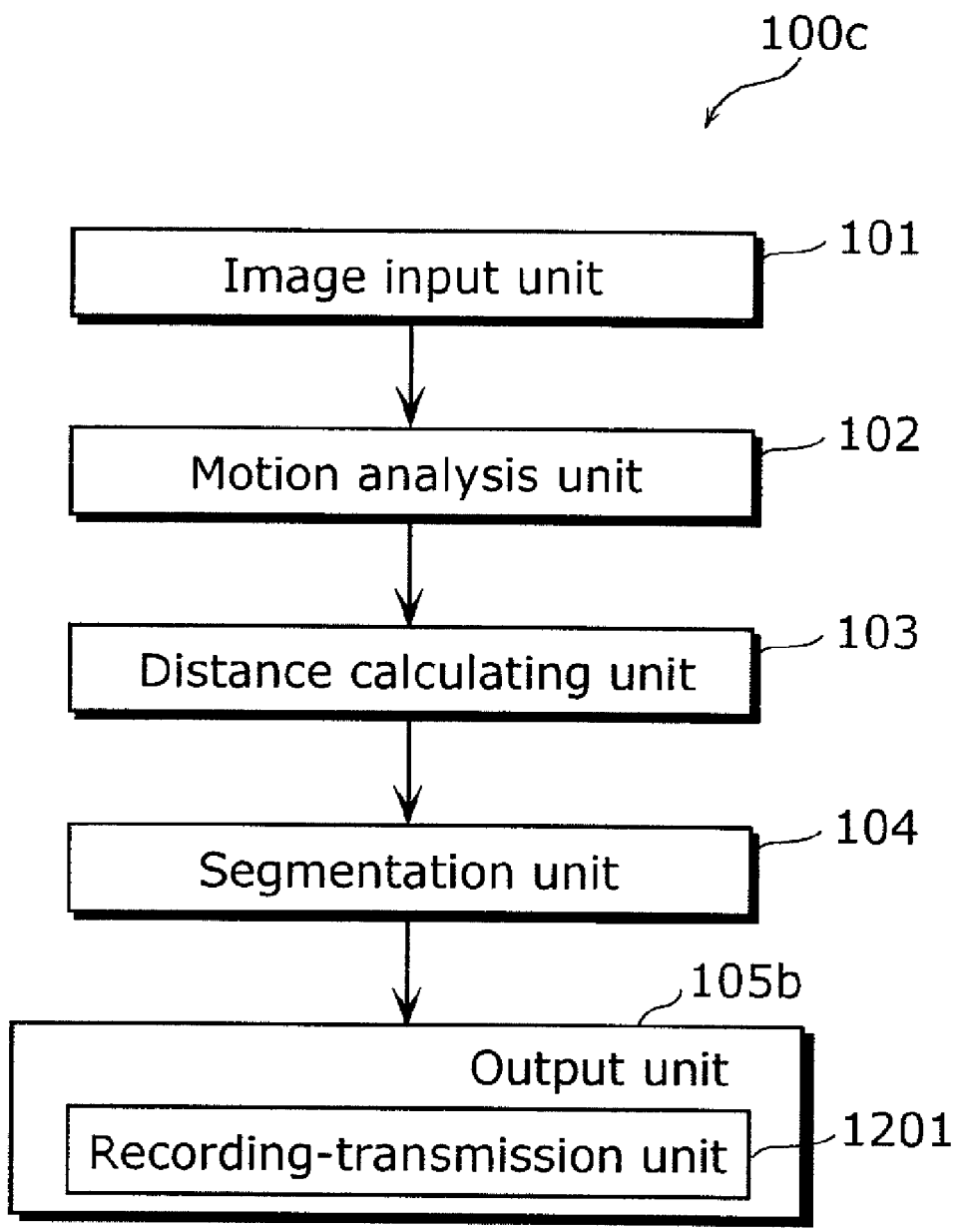
FIG. 16 is a functional block diagram showing an example of a configuration of the moving object detection apparatus according to a second variation of the first and the second embodiments of the present invention.

Next, a moving object detection apparatus according to a second variation of the first and the second embodiments will be described. Here described is an example in which a function to record and transmit the result of the detection and segmentation performed on the moving object in the first and second embodiments is added. Here, a variation in the first embodiment will be described, but it is also applicable in the variation of the first embodiment, and the second embodiment. A moving object detection apparatus 100c according to the second variation, as shown by a functional block diagram in FIG. 16, includes: the image input unit 101, the motion analysis unit 102, the distance calculating unit 103, the segmentation unit 104, and an output unit 105b. Here, the output unit 105b has a recording-transmission unit 1201 in addition to the function of the output unit 105 according to the first embodiment.

The recording-transmission unit 1201 is a processing unit which specifies a region in a picture entered at the image input unit 101, based on the result of the segmentation performed by the segmentation unit 104, and, for each region thus specified, records a corresponding result of the segmentation onto a recording medium such as a memory or a hard disk or transmits the result to the outside via a communication interface or the like. That is, the recording-transmission unit 1201, as with the case of image display, separately records and transmits images resulting from the segmentation according to each region label $\theta_m$. In addition, it is also possible to compress the motion information by averaging motion information belonging to each region as below. Although it is lo normally necessary to hold motion information, holding one motion for one region is sufficient if the processing is performed as below. For example, in the case of using the motion vector $(u^i_t, v^i_t)$ of the pixel i as the motion information, it is possible to calculate averaged motion information for each of the separate regions as follows.

(Expression 25)

$$u_t^m = \frac{1}{C_m} \sum_{c_m=1}^{C_m} u_t^{c_m} \qquad \text{[Math. 25]}$$

(Expression 26)

$$v_t^m = \frac{1}{C_m} \sum_{c_m=1}^{C_m} v_t^{c_m} \qquad \text{[Math. 26]}$$

Here, $C_m$ is the number of pixels or the number of movement trajectories that belong to a region $\theta_m$. $u^{Cm}_t$ and $v^{Cm}_t$ are pixel motion vectors belonging to the region $\theta_m$. An example is shown in which segmentation is performed on the processing result shown in FIG. 15(a), with an input of t images at time T, and segment regions are recorded or transmitted using the result. As identifiers, the following is recorded and transmitted: each region label $\theta_m$; a pixel position and a pixel value of the picture at time T, which belong to each of region labels $\theta_1$ to $\theta_3$; and a motion vector $u^m_T, v^m_T, u^m_{T+1}, v^m_{T+1}, \ldots, u^m_{T+t}, v^m_{T+t}$ from time T to time T+t, which corresponds to each of the region labels. Naturally, instead of using the pixel position and the pixel value of the image, a picture at time T may be assigned with a region label on a per-pixel basis and be transmitted. Since it is only necessary to transmit the motion information for several minutes, an advantageous effect of allowing more efficient recording and transmission is produced than in the case of transmitting t pictures. Particularly, the smaller the number of regions in relation to the number of pixels is, the more efficient is the transmission. Furthermore, as shown in FIG. 13(c), the recording and transmission may be performed in accordance with a hierarchical clustering result. For example, in the case of small capacity of memory or transmission for the data, a motion vector corresponding to the clustering result obtained with a larger threshold may be recorded or transmitted, or motion vectors ranging from a motion vector based on a rough clustering result to a motion vector based on a detailed clustering result, may be sequentially recorded or transmitted in a hierarchical order. Thus produced is an advantageous effect of enabling recording and transmission adapted to recording time and transmission capacity.

Note that in the case of compressing motion information using affine motion, an average value of the pixel position which has moved based on the affine motion may be calculated, instead of using Expressions 25 and 26 above. As above, it is possible to compress pixel motion information, and to record and transmit the regions. This produces another advantageous effect of realizing high coding efficiency by using a piece of motion information for each region, in addition to the advantageous effect of allowing correct segmentation even on the video including a person that moves changing shape as described in the first and the second embodiments.

Furthermore, by separately providing a segment region restoring unit, it is also possible to restore the information that has been transmitted and recorded. Specifically, the picture at time T is restored based on the pixel position and the pixel value which correspond to each of the region labels shown in FIGS. 15(*a*) and (*b*). Furthermore, by moving each pixel at time T, using pixel movement trajectory information, it is possible to restore a picture from time T+1 to T+t. Here, in the case of using a fixed camera, the reconstructed image may be superimposed on a background image by using only pixel movement trajectory information that is not 0, and further previously obtaining and holding the background image in the segment region restoring unit. This produces an advantageous effect of allowing reconstruction of a picture with a small amount of calculation, using the information efficiently transmitted and recorded.

[Variation 3 of Embodiments 1 and 2]

Next, a moving object detection apparatus according to a third variation of the first and the second embodiments will be described. Here, an example of realizing detection and segmentation with higher accuracy by using two or more distance scales will be described. Here, a variation in the first embodiment will be described, but it is also applicable in the variation of the first embodiment, and the second embodiment. Such a moving object detection apparatus according to the third variation has the same configuration as in the first embodiment, and thus the description thereof will be omitted.

The first and the second embodiments are different in the processing performed by the distance calculating unit 103.

The difference from the first embodiment is that the distance calculating unit 103 uses an additional parameter so as to perform processing with higher accuracy. The following will mainly describe the difference from the first embodiment.

The distance calculating unit 103 uses a distance scale related to a distance between movement trajectories on the image and variation thereof, and a distance scale related to an angle between pixels on the image (that is, a gradient angle of a straight line connecting the pixels (the angle defined by the straight line and a horizontal axis of the picture)) and variation thereof, so as to calculate a distance matrix for each of the distance scales. Then, the processing with higher accuracy is realized by integrating both matrices.

Figure 3:
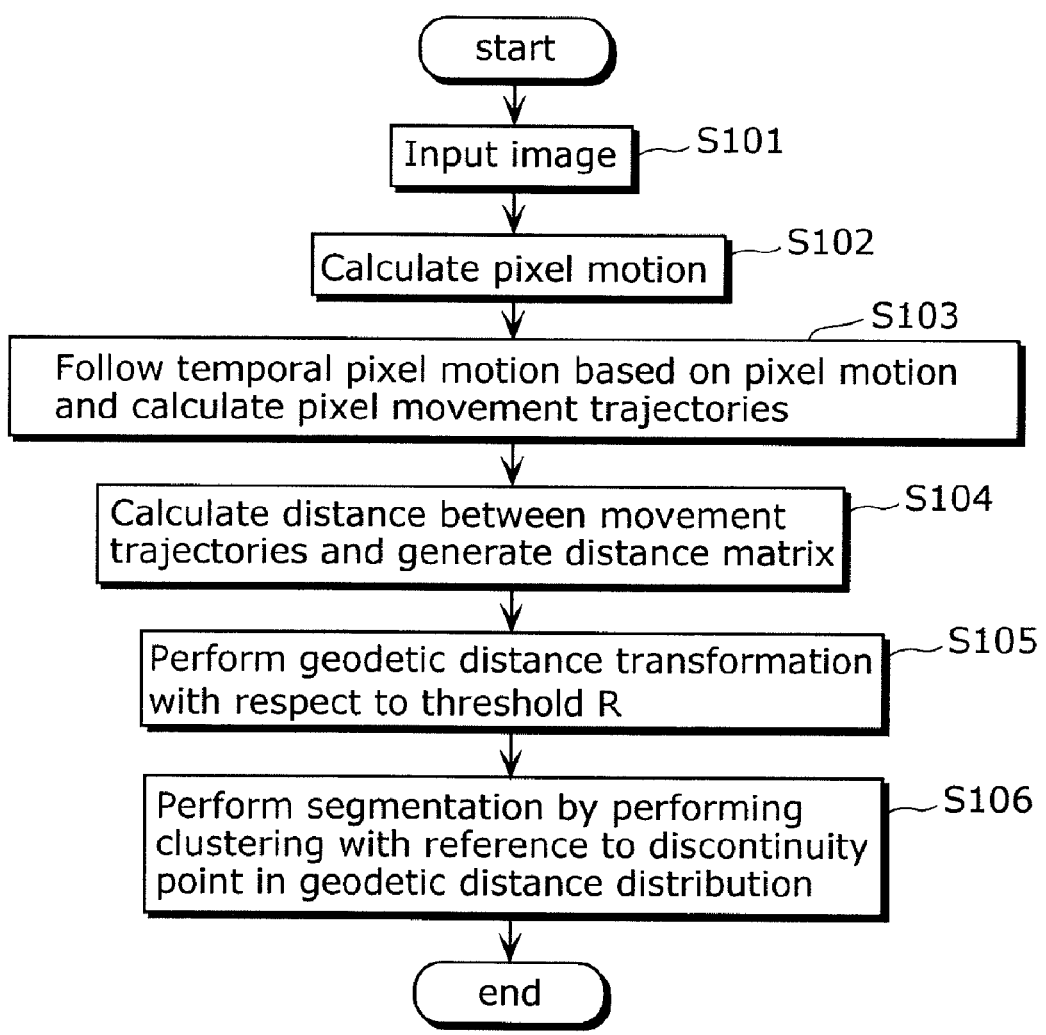
FIG. 3 is a flowchart showing a basic operation of the moving object detection apparatus according to the first embodiment of the present invention.

Here, the description is given according to the processing flowchart shown in FIG. 3. First, since Steps S101 to S103 are the same as in the first embodiment, the description thereof will be omitted.

Next, in Step S104, the distance calculating unit 103 calculates the distance matrix including similarity in pixel motion, using the movement trajectory i calculated by Expression 2 above. Here described is an example of using, as a second distance scale, a distance $f_2(i,j)$ expressed in Expression 27 below and based on an angle defined by the pixel i and the pixel j, in addition to the distance f(i, j) expressed in Expression 3 or 4 above.

[Math. 27]

$$f_2(i,j) = a\_mean_{ij} + w_a \cdot \sqrt{a\_var_{ij}} \qquad \text{(Expression 27)}$$

Here, $w_a$ is a weighting factor, and is parameter to be set by a designer. In addition, $a\_mean_{ij}$ and $a\_var_{ij}$ are expressed below.

(Expression 28)

$$a\_mean_{ij} = \frac{1}{T}\sum_{t=1}^{T} a_{ij}^t \qquad \text{[Math. 28]}$$

(Expression 29)

$$a\_var_{ij} = \frac{1}{T}\sum_{t=1}^{T} (a_{ij}^t - a\_mean_{ij})^2 \qquad \text{[Math. 29]}$$

Here, (Expression 30)

$$a_{ij} = \arctan\left(\frac{y_t^i - y_t^j}{x_t^i - x_t^j}\right) \qquad \text{[Math. 30]}$$

As described above, it is possible to represent similarity in pixel motion, using the angle defined by the pixel i and pixel j, and the variation component thereof. This allows capturing of not only a solid body but also shape variation involving, in particular, rotational movements of an articulated object or the like.

Note that any distance value may be used for $f_2(i, j)$ as long as it allows evaluation of the similarity in pixel motion; for example, Expressions 31 to 33 below may be used instead of Expressions 28 to 30 above, or Expression 34 below using the affine parameter $A_t^i$ in Expression 2 above may be used instead of Expression 33 below. Expressions 31 to 33 below can express similarity in pixel motion, using an angle difference between motion vectors of the pixels i and j, and the variation component thereof. This allows capturing motion variation including rotation. Expression 34 below can express the similarity in pixel motion, using an affine parameter difference between neighborhood blocks of the motion vectors of the pixels i and j, and the variation component thereof. This allows capturing motion variation including rotation, parallel movement, and scale transition.

(Expression 31)

$$\text{a\_mean}_{ij} = \frac{1}{T-1}\sum_{t=1}^{T-1} a_{ij}^t \qquad [\text{Math. 31}]$$

(Expression 32)

$$\text{a\_var}_{ij} = \frac{1}{T-1}\sum_{t=1}^{T-1}(a_{ij}^t - \text{a\_mean}_{ij})^2 \qquad [\text{Math. 32}]$$

However, (Expression 33)

$$a_{ij}^t = \arctan\left(\frac{y_{t+1}^i - y_t^i}{x_{t+1}^i - x_t^i}\right) - \arctan\left(\frac{y_{t+1}^j - y_t^j}{x_{t+1}^j - x_t^j}\right) \qquad [\text{Math. 33}]$$

(Expression 34)

$$a_{ij}^t = \|A_t^i - A_t^j\| \qquad [\text{Math. 34}]$$

Next, as expressed in the following Expression 35 below, the distance matrix calculated by Expression 27 above is added to the distance matrix calculated by Expression 3 above. Here, the distance between pixels and the angle between the pixels will be described, but three or more distances may be calculated using another distance expressing the similarity in pixel motion.

[Math. 35]

$$f(i,j) = f_1(i,j) + w \cdot f_2(i,j) \qquad \text{(Expression 35)}$$

Here, w is a weighting coefficient to be set by a designer.

Since it is sufficient to perform, after Step S105, the same processing using the distance matrix calculated by Expression 35 above, the subsequent description will be omitted.

In the manner described above, the moving object detection apparatus according to the present embodiment can perform detection and segmentation as a result of temporally going, with higher accuracy, through the regions of the moving object that moves in video by: calculating the distance matrix for each of the distance scales, using the distance scale related to the distance between the pixels on the image and the variation thereof and the distance scale related to the angle defined by the pixels on the image and the variation thereof, and performing clustering on continuity after integrating the respective distance matrices. Furthermore, by using, as the distance scale, the angle defined by the pixels on the picture and the variation thereof, it is particularly possible to capture, more accurately, the rotational movements deriving from joint movement. In addition, since the clustering is performed based on the similarity between movement trajectories without requiring setting of a human candidate region as preprocessing, no failure occurs in detecting the human candidate region, which becomes a problem particularly when moving objects having various sizes are present in the image or when a part of the moving object is occluded, nor does such false detection cause a failure in the segmentation.

As described above, it is possible to perform, with higher accuracy, detection of a moving object such as a person or the like that moves changing shape and segmentation on the moving object.

[Embodiment 3]

According to the present embodiment, a moving object detection apparatus will be described which has an additional function to predict a motion of the moving object based on the result of the detection and segmentation performed on the moving object using the moving object detection method according to the first and the second embodiments. Here, the description will be given according to the first embodiment, but the moving object detection apparatus can also be realized in the first and the second embodiments and the variations thereof.

Figure 18:
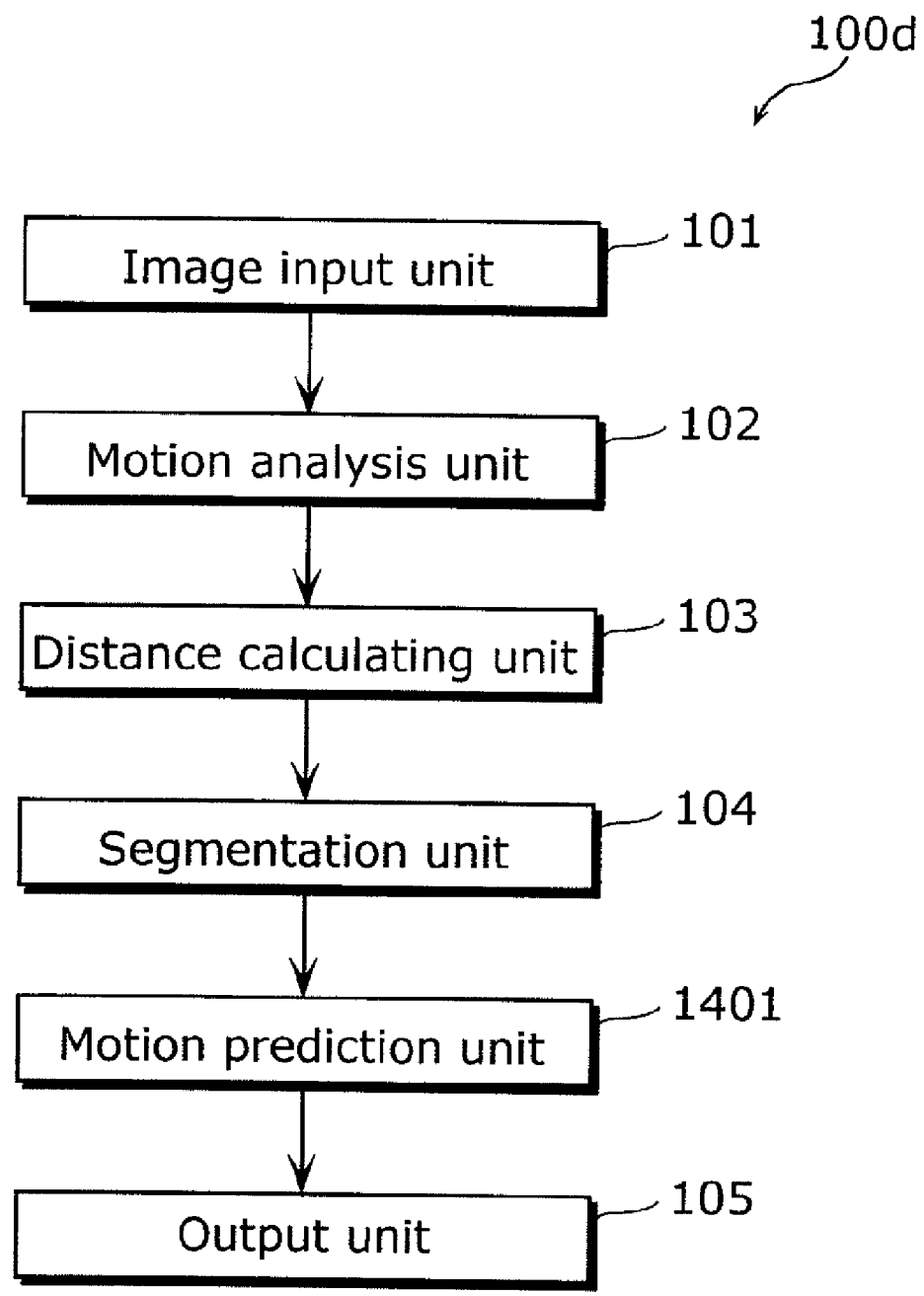
FIG. 18 is a functional block diagram showing an example of a configuration of a moving object detection apparatus according to a third embodiment of the present invention.

FIG. 18 is a functional block diagram showing a basic configuration of a moving object detection apparatus 100d according to a third embodiment. As shown in FIG. 18, the moving object detection apparatus 100d according to the present embodiment has a function to predict the motion of the moving object, with a motion prediction unit 1401 provided in addition to the image input unit 101, the motion analysis unit 102, the distance calculating unit 103, the segmentation unit 104, and the output unit 105.

Figure 19:
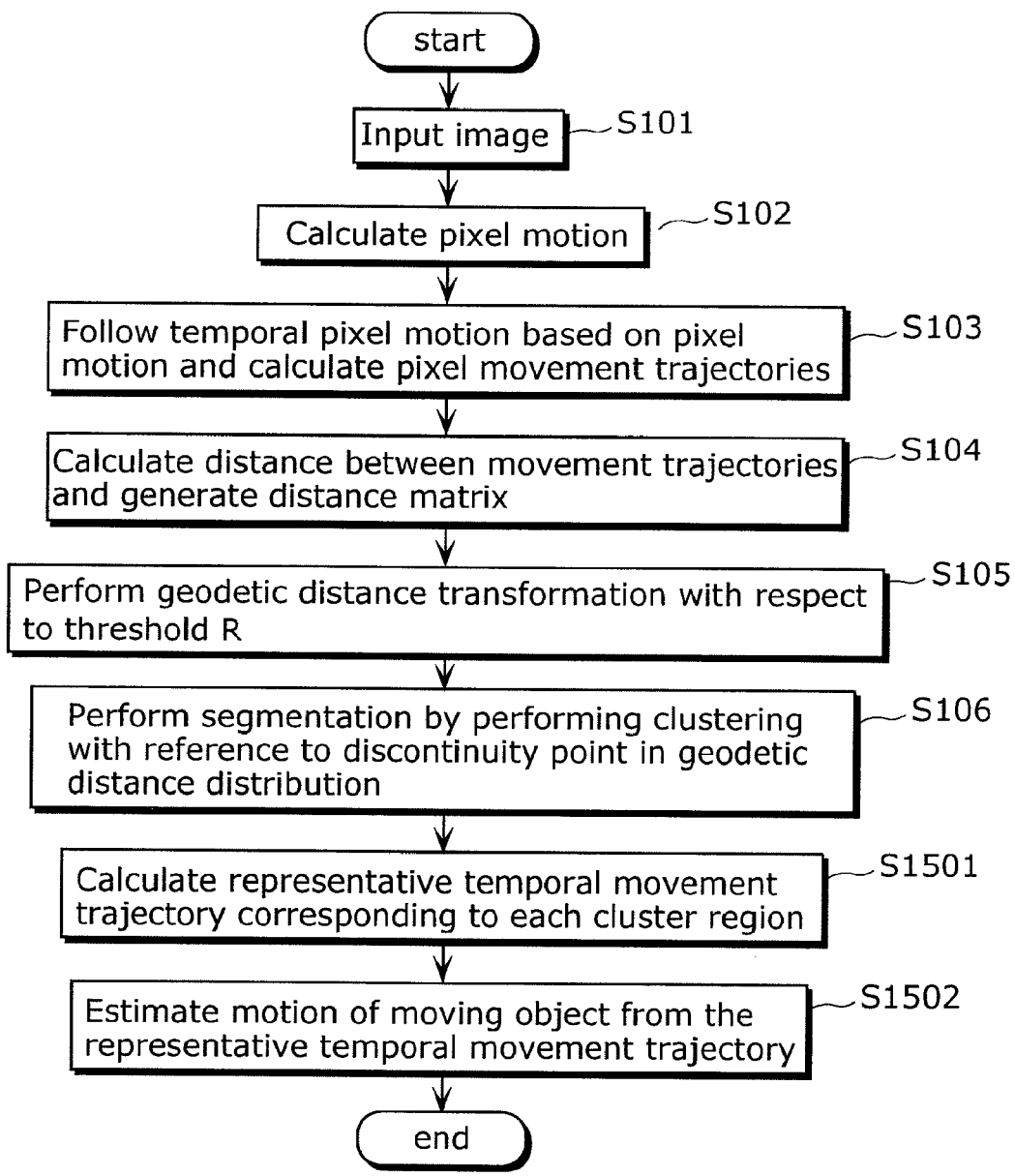
FIG. 19 is a flowchart showing a basic operation of the moving object detection apparatus according to the third embodiment of the present invention.

The motion prediction unit 1401 calculates a representative trajectory from movement trajectories of pixels included in each region, based on the result of the segmentation, and predicts motion of the moving object based on the representative trajectory. FIG. 19 shows a flowchart of the processing according to the third embodiment. Since Steps S101 to S106 are the same as in the first embodiment, the description thereof will be omitted.

Next, in Step S1501, the motion prediction unit 1401 calculates, as below, a representative point and the representative trajectory of the cluster, using the result of the segmentation performed in Steps S105 and S106.

Here, movement trajectories of pixels belonging to a region $\theta_m$ are expressed as $x^{Cm}$. As shown by the following Expression 36, a representative movement trajectory is calculated for each cluster region $\theta_m$. Here, an example of calculating an average movement trajectory as the representative movement trajectory will be described, but the weighting or the like may be performed in the calculation below for each of the movement trajectories $x^{Cm}$ of pixels, or the movement trajectory of pixels corresponding to a cluster center on the image may be considered as the representative movement trajectory.

(Expression 36)

$$\bar{x}^m = \frac{1}{C_m}\sum_{c=1}^{C_m} x^{cm} \qquad [\text{Math. 36}]$$

Here, $C_m$ is the number of pixels or the number of movement trajectories that belong to the region $\theta_m$.

Figure 20:
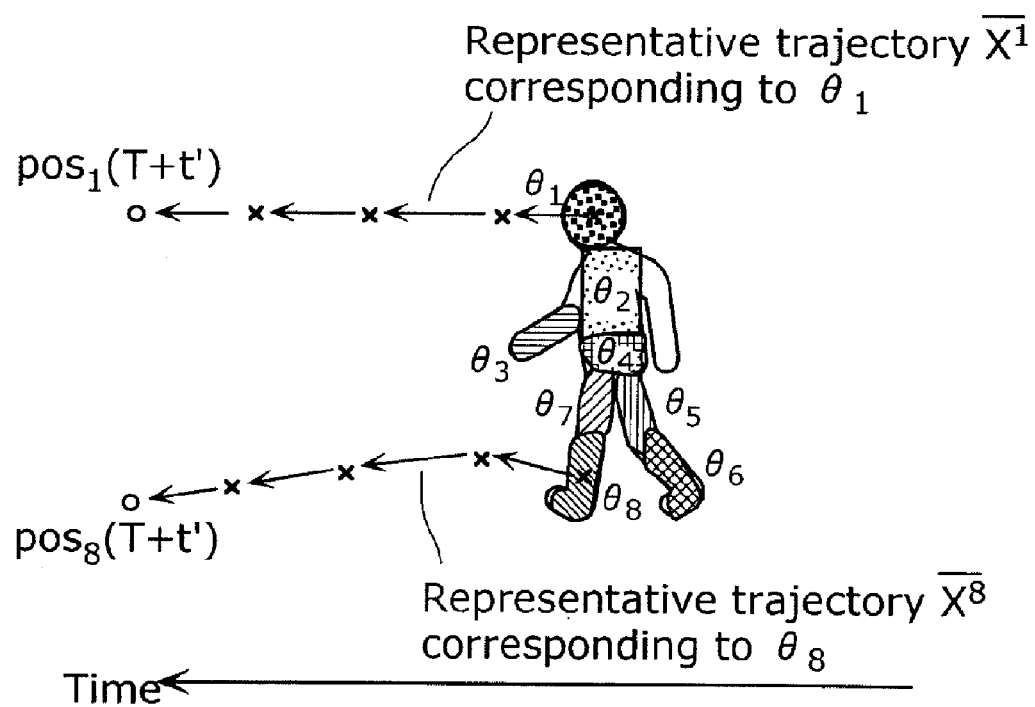
FIG. 20 is a diagram showing an example of motion prediction according to the third embodiment of the present invention.

FIG. 20 shows an example of calculating the representative movement trajectory for each cluster region $\theta_m$, based on Expression 36 above. However, in consideration of viewability, only a cluster region $\theta_1$ corresponding to a head region and a representative trajectory related to a cluster region $\theta_8$ corresponding to a leg region are shown. Each x in the figure is an element of $x^{m-}$ corresponding to time t and indicates a pixel position. Furthermore, as shown in Expressions 3 and 4, the segmentation through the clustering on the nonlinear space is performed considering the similarity in pixel motion, and thus allows calculation using only the movement trajectories of pixels having similarity in motion; therefore, as compared to a method of simply calculating a temporal average of adjacent movement trajectories, it is possible to calculate the representative trajectory with higher accuracy. Thus, it is possible to represent, accurately and easily, the motion of each region by calculating the representative trajectory for each cluster region.

Next, in Step S1502, the motion prediction unit 1401 predicts the position of the moving object at a time earlier than time T, from the representative movement trajectory calculated in Step S1501. First, an example of calculating acceleration from the representative trajectory, and predicting the position of the moving object after T+1 will be described. When three or more time-series images are inputted, it is possible to obtain an acceleration vector $s^m$ for each representative movement trajectory $x^{m-}$ as expressed in the following Expression 37.

[Math. 37]

$$s_{t+1}{}^m = \{u_{t+1}{}^{m1} - u_t{}^m\} - \{u_t{}^m - u_{t-1}{}^m\} \quad \text{(Expression 37)}$$

Here, $u^m{}_t$ is a motion vector and can be expressed as in the following Expression 38.

[Math. 38]

$$u_t{}^m = (u_t{}^m, v_t{}^m) \quad \text{Expression 38)}$$

By using the acceleration vector in Expression 37 above, it is possible to predict, as indicated by arrows and circles in FIG. 20, a regional position $pos_m(T+t')$ of the moving object at time T+t' for each region of the moving object as shown in the following Expression 39. Here, the regions of the moving object are given as an example, but it is possible to predict the position of each moving object from the example of detection as shown in FIGS. 15(a) and (b).

(Expression 39)

$$pos_m(T + t') = pos_m(T) + t' u_T^m + \frac{1}{2} t'^2 s_T^m \quad \text{[Math. 39]}$$

Then, the output unit 105 outputs the position of the moving object or the region of the moving object that has been predicted in Step S1502. This allows a prediction considering acceleration. This produces an advantageous effect of allowing, when the motion suddenly accelerates or stops, predicting the position of the moving object by reflecting the acceleration of the motion. In addition, the affine parameter may be used instead of the motion vector. Since the affine parameter allows representing motions including rotational movement and is appropriate for representing rotation of arms or legs, it is possible to predict, particularly, the position of an articulated object with higher accuracy.

Furthermore, instead of the motion vector and acceleration described above, it is also possible to fit the Nth-order function directly to the representative movement trajectory $x^m$. When inputting serially-arranged T images, it is possible to perform fitting, using the Nth-order function, on the position information on the T images included in $X^{m-}$. This allows estimating the position $pos_m(T+t')$ on the image at time (T+t') such that the position satisfies the value of the fitting function. Specifically, since the fitting using the function allows representation of smoother movements, it is possible to perform prediction with higher accuracy. Particularly, since it is possible to perform prediction along with the fitting function, the motion prediction is more accurate when the fitting function is closer to an original motion. Naturally, the position prediction on these images is applicable to time interpolation.

As above, according to the present embodiment, the movement trajectories of pixels having a similar motion can be calculated as the same cluster, thus allowing obtaining the representative movement trajectory with high accuracy. Particularly, it is possible to express motions of each region of the articulated object or the like, thus producing an advantageous effect of allowing predicting the region position of the moving object with higher accuracy without setting a human candidate region as preprocessing.

Thus far, the moving object detection method and the moving object detection apparatus according to the present invention have been described based on the embodiments and the variations thereof, the present invention is not limited to these embodiments and variations. Those skilled in the art will readily appreciate that many modifications are possible in the exemplary embodiments without departing from the novel teachings and advantages of this invention. Accordingly, all such modifications are intended to be included within the scope of this invention.

In addition, any modification realized as an arbitrary combination of characteristic constituent elements in all the embodiments and variations described thus far is also intended to be included within the scope of the present invention.

(Complementary Description of Geodetic Distance Transformation)

Figure 21:
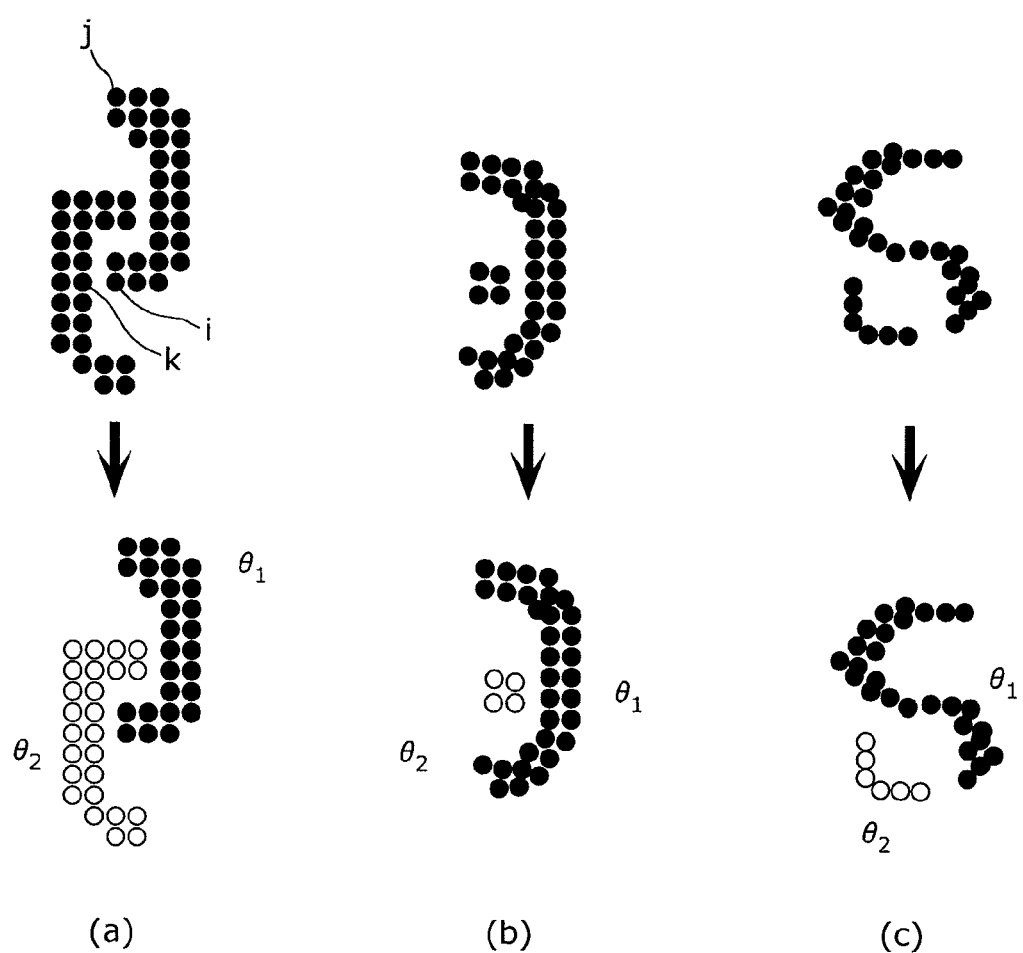
FIGS. 21(a) to (c) is a diagram showing an example of a figure dividable by a method according to the second embodiment of the present invention.

Lastly, a property of regions on an image divided through segmentation using geodetic distance transformation will be described. Here collaterally described is an example of a property of the moving object that is dividable in the case of using the method described in the second embodiment. FIGS. 21(a) to (c) show an example of a graphic that is dividable in the case of using the method according to the second embodiment. It is possible to perform segmentation into figures $\theta_1$ and $\theta_2$ using the method according to the second embodiment. Here, movement directions of the figures $\theta_1$ and $\theta_2$ shown in FIGS. 21(a) to (c) may be the same or different. However, it is prerequisite that all the pixels belonging to the figures $\theta_1$ have the same motion, and that the pixels belonging to the figure $\theta_2$ have the same motion.

Figure 5:
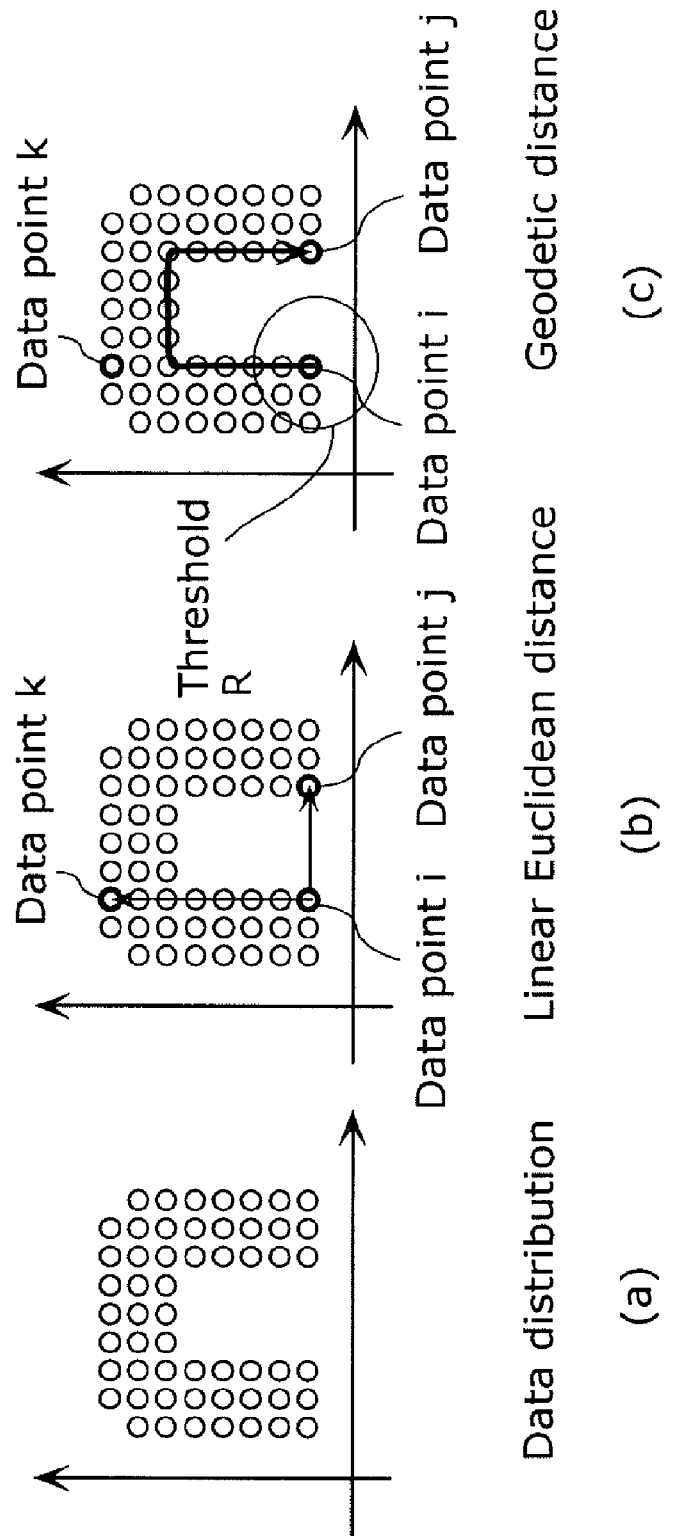
FIGS. 5(a) to (c) is a diagram showing an example of an advantageous effect produced by a segmentation unit using a geodetic distance according to the first embodiment of the present invention.

In Step S601 according to the second embodiment, the geodetic distance transformation having the feature as shown in FIG. 5 is performed. With this, the transformation is characterized by allowing calculating a distance which passes through one movement trajectory to another movement trajectory, unlike the ordinary Euclidean distance. Thus, it is possible to calculate the distance along a curved shape as commonly seen in FIGS. 21(a) to (c).

Furthermore, in Step S602, clustering is performed using a discontinuity point between movement trajectories having an infinite geodetic distance. Thus, when the distance between the movement trajectories has a distance equal to or above the threshold, it is possible to divide the moving object into separate regions $\theta_1$ and $\theta_2$.

As above, use of the segmentation involving the geodetic distance transformation allows a segmentation based on the discontinuity point in the case where the moving object includes a curved shape and where there is a certain discontinuity point.

On the other hand, when the processing of Step S601 is not performed, the distance between the movement trajectory belonging to $\theta_1$ and the movement trajectory belonging to $\theta_2$ is calculated in the Euclidean distance, and thus, as shown in the case described with reference to FIG. 5, the distance between points i and j is larger than the distance between the points i and k. That is, the distance between the points belonging to the same class is larger than the distance between the points belonging to different classes. Furthermore, in the processing performed in Step S602, since the processing of going through the data cannot be performed without performing geodetic distance transformation, it is not possible to determine whether adjoining movement trajectories are continuous or discontinuous. Thus, in the example as shown in FIGS. 21(a) to (c), it is difficult to perform segmentation based on the discontinuity point in the case where the moving object includes a curved shape and where there is a certain discontinuity point.

Thus, with a moving object detection method and a moving object detection apparatus as described in the embodiments and variations according to the present invention, the clustering using the geodetic distance is performed giving more consideration to continuity related to similarity between movement trajectories than in the clustering using the Euclidean distance, thus making it possible to reliably discriminate whether regions belong to the same object (or the region) or to another separate object (or region) even if the regions have intricate relations.

Industrial Applicability

The present invention is applicable as an apparatus which detects all or part of a moving object in video, that is, a moving object detection apparatus which detects the moving object in the video by dividing, into regions, an image including the moving object such as a person that moves changing shape, based on motions of a block including one or more pixels in plural images, and is applicable, for example, as a moving object detection device or the like to be incorporated in audio-video equipment such as a motion analyzer, a monitoring apparatus, a video camera, or a TV set.

Reference Signs List

100, 100a to 100d Moving object detection apparatus
101 Image input unit
102 Motion analysis unit
103 Distance calculating unit
104, 104a Segmentation unit
105, 105a, 105b Output unit
501 Region candidate generating unit
502 Region candidate selecting unit
1001 Image display unit
1201 Recording-transmission unit
1401 Motion prediction unit

The invention claimed is:

1. A moving object detection method for detecting a moving object in video by dividing all or part of the moving object in the video into regions, said moving object detection method comprising:
   accepting pictures included in the video;
   calculating movement trajectories by detecting motions between two pictures in units of blocks constituting each of the pictures and each including one or more pixels, and concatenating detected motions for all the pictures;
   calculating distances each indicating similarity between the movement trajectories, for the movement trajectories calculated in said calculating of movement trajectories;
   performing segmentation by: transforming the distances calculated in said calculating of distances into geodetic distances by combining distances smaller than a predetermined threshold from among the distances calculated in said calculating of distances; detecting a discontinuity point in a distribution of the obtained geodetic distances; and classifying, into one cluster, movement trajectories separate from each other at a geodetic distance smaller than a length indicating the detected discontinuity point; and
   outputting a result of the segmentation performed in said performing.

2. The moving object detection method according to claim 1,
   wherein in said performing, when, in transforming the distances into the geodetic distances, a distance between a first movement trajectory and a second movement trajectory is transformed into a geodetic distance, a distance of a path leading from the first movement trajectory to the second movement trajectory is calculated as a geodetic distance by going through movement trajectories separate at a distance smaller than the predetermined threshold, the distance of the path being among the distances calculated in said calculating of distances.

3. The moving object detection method according to claim 1,
   wherein in said performing, the distances calculated in said calculating of distances are transformed into the geodetic distances after weighting is performed such that the geodetic distances become smaller for a higher density of the distribution of the movement trajectories.

4. The moving object detection method according to claim 1,
   wherein said performing includes:
   generating thresholds to be used for the segmentation and combining, for each of the generated thresholds, distances smaller than the each of the thresholds from among the distances calculated in said calculating of distances, to thereby transform the distances calculated in said calculating of distances into the geodetic distances, and detecting the discontinuity point in the distribution of the obtained geodetic distances and classifying, into one cluster, movement trajectories separate from each other at a geodetic distance smaller than the length indicating the detected discontinuity point to thereby perform the segmentation, so as to generate region candidates as a result of the segmentation; and
   obtaining an instruction regarding the number of classes and selecting, from among the region candidates generated in said generating, a region candidate which is divided into the number of regions that is equal to or closest to the obtained number of classes, so as to output the selected region candidate as a result of the segmentation.

5. The moving object detection method according to claim 4,
   wherein in said generating, values between a maximum value and a minimum value in the distances calculated in said calculating of distances are generated as the thresholds.

6. The moving object detection method according to claim 4,
   wherein in said generating, an initial discontinuity point is detected for each of the distances calculated in said calculating of distances, when the thresholds are arranged in an order starting from a largest value to a smallest value, and values smaller than a length indicating the detected initial discontinuity point are generated as the thresholds.

7. The moving object detection method according to claim 4,
   wherein in said generating, the discontinuity point is detected for each of the distances calculated in said calculating of distances, and the segmentation is hierarchically performed according to threshold value.

8. The moving object detection method according to claim 7,
   wherein in said generating, the segmentation is hierarchically performed by detecting the discontinuity point for each of the distances calculated in said calculating of distances, in an order starting from a largest threshold, and detecting the discontinuity point using a smaller threshold in each of the clusters resulting from the segmentation.

9. The moving object detection method according to claim 4,
wherein in said generating, values are generated as the thresholds by increasing and decreasing the values of the distances calculated in said calculating of distances, centering on a mean value or a median.

10. The moving object detection method according to claim 4,
wherein in said generating, for each of the movement trajectories calculated in said calculating of movement trajectories, distances that are Nth smaller from the each of the movement trajectories are specified, and values selected for each of the specified distances in an order starting from a largest value are generated as the thresholds.

11. The moving object detection method according to claim 1,
wherein in said performing, a predetermined number of movement trajectories are selected for each of the distances calculated in said calculating of movement trajectories, in an order starting from a smallest distance, and the each of the distances is transformed into a geodetic distance after a distance from an unselected movement trajectory is nonlinearized into an infinite value.

12. The moving object detection method according to claim 1,
wherein in said performing, from among the movement trajectories calculated in said calculating of movement trajectories, movement trajectories of which the distance is equal to or smaller than a predetermined threshold are selected, and each of distances is transformed into a geodetic distance after a distance from an unselected movement trajectory is nonlinearized into an infinite value.

13. The moving object detection method according to claim 1,
wherein in said calculating of movement trajectories, one of a two-dimensional motion vector and an affine parameter which indicate the motion is calculated for the detection of the motion.

14. The moving object detection method according to claim 1,
wherein in said calculating of distances, in addition to the similarity between the movement trajectories of the blocks, at least one of a distance between the blocks in the picture and an angle indicating a gradient of a line connecting the blocks is calculated.

15. The moving object detection method according to claim 1,
wherein said outputting includes
displaying the result of the segmentation obtained in said performing, by superimposing the result on the pictures accepted in said accepting.

16. The moving object detection method according to claim 1,
wherein in said accepting, video including two or more moving objects is accepted, and
in said performing, the two or more moving objects are detected by performing the segmentation on the two or more moving objects.

17. The moving object detection method according to claim 1, further comprising
predicting a motion of the moving object by calculating a movement trajectory representing a region specified in said performing, from movement trajectories of the blocks constituting the region, and predicting that the region is to move in accordance with the calculated movement trajectory representing the region.

18. The moving object detection method according to claim 1,
wherein said outputting includes
specifying regions in the pictures accepted in said accepting, based on the result of the segmentation performed in said performing, so as to record or transmit, to a storage unit, the result of the segmentation corresponding to each of the specified regions.

19. A moving object detection apparatus for detecting a moving object in video by dividing all or part of the moving object in the video into regions, said moving object detection apparatus comprising:
an image input unit configured to accept pictures included in the video;
a motion analysis unit configured to calculate movement trajectories by detecting motions between two pictures in units of blocks constituting each of the pictures and including one or more pixels, and concatenating detected motions for all the pictures;
a distance calculating unit configured to calculate distances each indicating similarity between movement trajectories, for the movement trajectories calculated by said motion analysis unit;
a segmentation unit configured to perform segmentation by: transforming the distances calculated by said distance calculating unit into geodetic distances by combining distances smaller than a predetermined threshold from among the distances calculated by said distance calculating unit; detecting a discontinuity point in a distribution of the obtained geodetic distances; and classifying, into one cluster, movement trajectories separate from each other at a geodetic distance smaller than a length indicating the detected discontinuity point; and
an output unit configured to output a result of the segmentation performed by said segmentation unit.

20. A non-transitory computer-readable recording medium storing a program for a moving object detection apparatus to detect a moving object in video by dividing all or part of the moving object in the video into regions, said program causing a computer to execute a moving object detection method comprising:
accepting pictures included in the video;
calculating movement trajectories by detecting motions between two pictures in units of blocks constituting each of the pictures and each including one or more pixels, and concatenating detected motions for all the pictures;
calculating distances each indicating similarity between the movement trajectories, for the movement trajectories calculated in said calculating of movement trajectories;
performing segmentation by: transforming the distances calculated in said calculating of distances into geodetic distances by combining distances smaller than a predetermined threshold from among the distances calculated in said calculating of distances; detecting a discontinuity point in a distribution of the obtained geodetic distances; and classifying, into one cluster, movement trajectories separate from each other at a geodetic distance smaller than a length indicating the detected discontinuity point; and
outputting a result of the segmentation performed in said performing.

* * * * *